United States Patent [19]

Ono et al.

[11] 4,340,661

[45] Jul. 20, 1982

[54] PHOTOGRAPHIC LIGHT SENSITIVE SHEET FOR COLOR DIFFUSION TRANSFER PROCESS

[75] Inventors: Shigetoshi Ono; Shinsaku Fujita, both of Minami-ashigara, Japan

[73] Assignee: Fuji Photo Film Co., Ltd., Minami-ashigara, Japan

[21] Appl. No.: 137,025

[22] Filed: Apr. 3, 1980

[30] Foreign Application Priority Data

Apr. 5, 1979 [JP] Japan .................................. 54-41311

[51] Int. Cl.$^3$ ................................................. G03C 7/00
[52] U.S. Cl. .................................... 430/223; 430/225; 430/226; 430/562
[58] Field of Search ............... 430/562, 223, 225, 222, 430/226

[56] References Cited

U.S. PATENT DOCUMENTS

| | | | |
|---|---|---|---|
| 4,055,428 | 10/1977 | Koyama et al. | 430/562 |
| 4,142,891 | 3/1979 | Baigrie et al. | 430/562 |
| 4,195,992 | 4/1980 | Stolzenburg et al. | 430/561 |

FOREIGN PATENT DOCUMENTS 2906526  8/1979  Fed. Rep. of Germany ...... 430/223

*Primary Examiner*—J. Travis Brown
*Attorney, Agent, or Firm*—Sughrue, Mion, Zinn, Macpeak and Seas

[57] ABSTRACT

A photographic light sensitive sheet for color diffusion transfer process which comprises a light sensitive silver halide emulsion layer associated with a novel azo dye-providing compound containing a —OR$^1$—O—R$^2$ moiety as an indispensable substituent wherein R$^1$ represents an alkylene group having 2 or more carbon atoms and R$^2$ represents an alkyl group or a substituted alkyl group.

29 Claims, 3 Drawing Figures

PHOTOGRAPHIC LIGHT SENSITIVE SHEET FOR COLOR DIFFUSION TRANSFER PROCESS

BACKGROUND OF THE INVENTION

1. Field of the Invention

The present invention relates to a photographic light sensitive sheet for color diffusion transfer process and, more particularly, to a silver halide photographic light sensitive sheet for the color diffusion transfer process which contains a novel dye-providing compound.

2. Description of the Prior Art

In a diffusion transfer photographic image forming process, a compound having a dye moiety bonded to a diffusibility controlling moiety is used. The diffusibility controlling moiety is a moiety which can change the diffusibility inherent in the dye-providing compound before development as a result of development under an alkaline condition. Dye-providing compounds are classified as dye releasing compounds and dye fixing compounds according to the operation of the diffusibility controlling moieties. Dye releasing compounds are non-diffusible by nature but release diffusible dyes as a result of development under an alkaline condition through the reaction of the diffusibility control moiety. As an example of such dye releasing compounds, mention may be made of dye releasing redox or DRR compounds. On the other hand, dye fixing compounds are diffusible (or release diffusible dyes) by nature, but they become non-diffusible (or do not release diffusible dyes) as a result of a development through the reaction of the diffusibility controlling moiety. As examples of such dye fixing compounds, mention may be made of compounds described in Japanese Patent Applications (OPI) 63618/'76 and 35533/'78. (The term "OPI" as used herein refers to a "published unexamined Japanese patent application".)

Color diffusion transfer color image forming processes using dye releasing redox compounds are described in Japanese Patent Applications (OPI) 33826/'73, 114424/'74, 126332/'74, 126331/'74, 115528/'75, 104343/'76; U.S. Pat. Nos. 3,928,312; 3,931,144 and 3,954,476 and Research Disclosure, vol. 130, No. 13024 (Feb. 1975). A dye releasing redox compound is a compound in which a diffusibility controlling moiety called a redox nucleus and a dye (including a dye precursor) moiety are connected. The redox nucleus renders the redox compound originally immobile by means of a ballast group attached thereto, but it splits to release a compound containing the dye moiety (dye compound) through a redox reaction under an alkaline condition. For example, a light sensitive element having a light sensitive silver halide emulsion layer associating with a redox compound of this kind is exposed to light and developed with an alkaline processing solution whereby the redox compound is oxidized in proportion to the amount of developed silver halide and splits into a compound containing a dye moiety and a nondiffusible compound (e.g., a nondiffusible quinone compound) in the presence of the alkaline processing solution. As a result, the compound containing the dye moiety diffuses into an image receiving layer to provide transferred images therein.

Examples of redox compounds which release yellow dyes are described in U.S. Pat. No. 3,928,312; Research Disclosure, supra; etc. However, the stability of their transferred images are insufficient (for example, the light fastness of the transferred image is not sufficient and the image fades to a large extent under light) and, further, transfer of the dye compounds cannot be accomplished to a satisfactory extent (e.g., the speed of transfer is too slow).

In addition, improved yellow dye releasing redox compounds are described in Japanese Patent Application (OPI) 7727/'77 corresponding to U.S. Pat. No. 4,013,633. However subsequent investigations have revealed that the dye compounds released therefrom have insufficient color fastness.

Further, Research Disclosure, vol. 164, No. 16475 (Dec., 1977) and Japanese Patent Application (OPI) 149328/'78 corresponding to U.S. Ser. No. 100,076 filed Dec. 4, 1979 describe other yellow dye releasing redox compounds, but further improvement to prevent change in hue brought about by changes in pH is needed therein.

SUMMARY OF THE INVENTION

A first object of the present invention is to provide a dye-providing compound which provides a stable yellow dye image.

A second object of the present invention is to provide a dye-providing compound having a dye moiety having excellent hue.

A third object of the present invention is to provide a dye-providing compound which provides transferred image whose hue remains unchanges over a wide pH range.

A fourth object of the present invention is to provide a dye-providing compound having a dye moiety whose transferability is improved.

A fifth object of the present invention is to provide a light sensitive sheet for the color diffusion transfer process containing a dye-providing compound which provides transferred dye image having sufficiently high optical density even in the presence of a relatively small amount of silver halide.

A sixth object of the present invention is to provide a so-called "negative utilizable" photographic light sensitive sheet for color diffusion transfer process in which the light sensitive element can be used as a negative.

It has now been found that the above-described objects are effectively attained with a photographic light sensitive sheet for color diffusion transfer process containing a dye-providing compound represented by the following formula (I) or (II), and the photographic light sensitive sheet has satisfactory photographic properties:

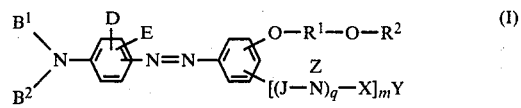

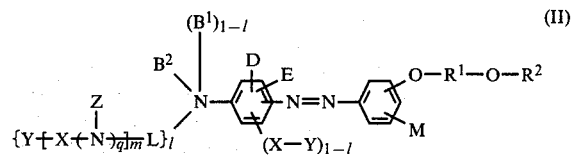

DETAILED DESCRIPTION OF THE INVENTION

Figure 1:
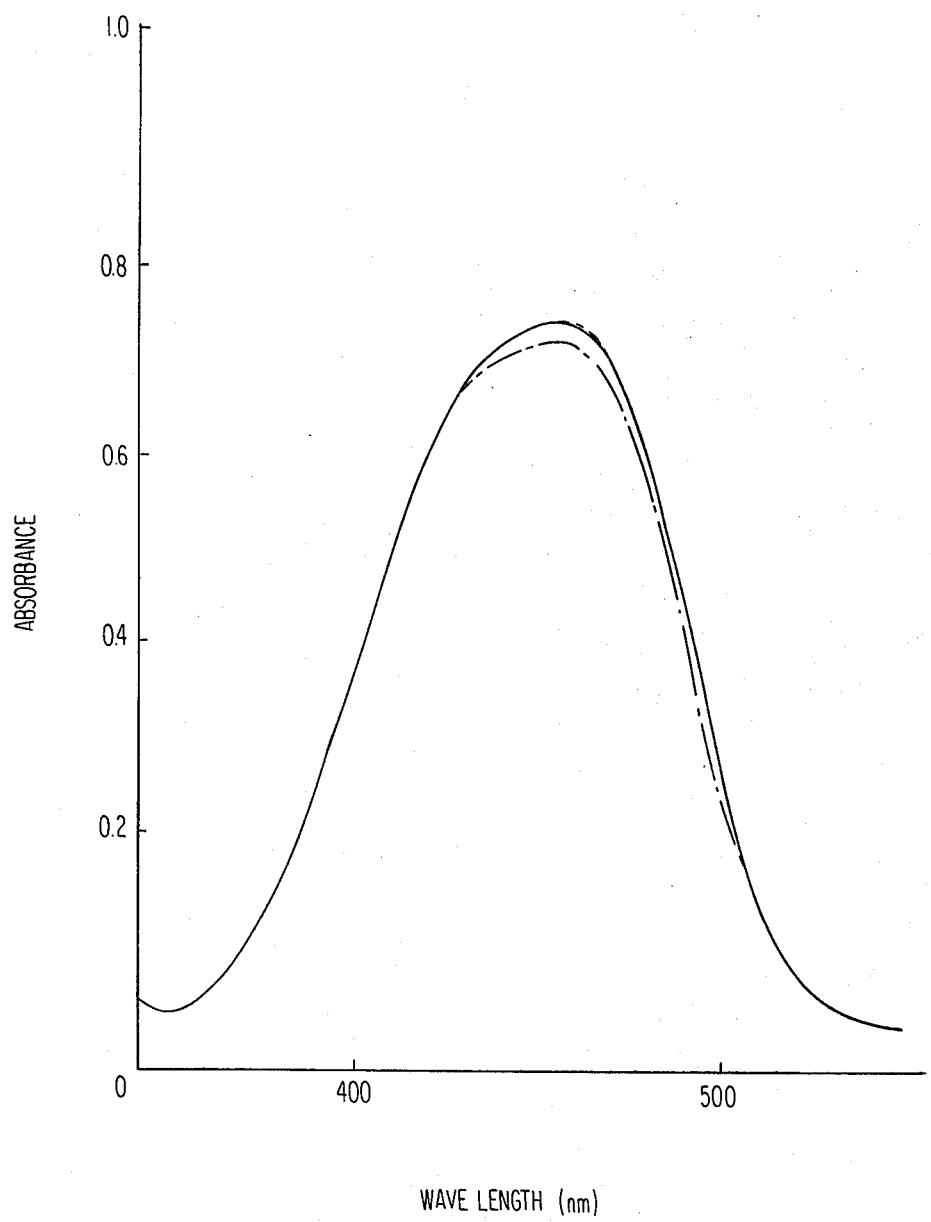
FIGS. 1 to 3 are visible absorption spectra of mordanted dye compounds A, B and C, respectively. Therein, curves drawn by continuous lines, curves drawn by dashed lines and curves drawn by alternating dots and lines are the spectra measured under conditions of pH=9.18, pH=6.86 and pH=4.51, respectively.

In the above-described general formulae (I) and (II), the dye-providing compound is characterized by the presence of -O-$R^1$-O-$R^2$ in the dye moiety. The presence of the -O-$R^1$-O-$R^2$ group prevents light discoloration of the transferred image as will be discussed in detail below, and thereby the stability of the color image in bright light is markedly improved.

In addition, the presence of the -O-$R^1$-O-$R^2$ group contributes to inhibiting a change in hue caused by a change in pH, which will also be discussed in detail hereinafter. By the introduction of the -O-$R^1$-O-$R^2$ group into the dye moiety, both the above-described effects can be achieved at the same time. When the dye moiety contains an alkoxy group or a hydrogen atom in the place of the -O-$R^1$-O-$R^2$ group the improvement in the keeping quality of the image in bright light and inhibition of a change in hue resulting from a change in pH cannot be satisfied at one time.

The dye-providing compounds according to the present invention are described in greater detail below.

$R^1$ represents an alkylene group having 2 or more carbon atoms, which may be a straight chain or branched chain alkylene group. An alkylene group having 2 to 8 carbon atoms is preferred but those branched chain alkylene groups which form an acetal linkage (i.e., both oxygen atoms in the -O$R^1$O$R^2$ group are bound to the same carbon) are excluded. Particularly preferred examples of $R^1$ are straight chain alkylene groups of the formula —$(CH_2)_p$— (where p is an integer of 2 to 4) and branched chain alkylene groups having 3 to 4 carbon atoms such as —$CH(CH_3)CH_2$—, —$CH_2CH_2CH(CH_3)$— and the like. From the standpoint of availability, —$CH_2CH_2$— is particularly advantageous as $R^1$. When $R^1$ represents a methylene group, it forms an acetal linkage, —O—$CH_2$—O—$R^2$, which is undesirable since the acetal linkage is chemically unstable, particularly under acidic conditions, and it tends to decompose during preparation.

$R^2$ represents an alkyl group or a substituted alkyl group. The alkyl group represented by $R^2$ can be a straight chain or a branched chain alkyl group and preferably, it is an alkyl group having 1 to 8 carbon atoms. From the standpoint of preparation, an unsubstituted alkyl group is preferred. Particularly preferred examples include straight chain and branched chain alkyl groups having 1 to 4 carbon atoms, e.g., specifically a methyl group, an ethyl group, an n-propyl group, an isopropyl group, an n-butyl group, etc. Of these groups, a methyl group and an ethyl group are most preferred. In particular, a methyl group can exert excellent effects upon the compounds of the present invention. The substituents for the substituted alkyl group represented by $R^2$ include, for example, an alkoxy group (preferably having 1 to 4 carbon atoms such as a methoxy group, an ethoxy group, etc.), a dialkylamino group (preferably having 1 to 4 carbon atoms in the alkyl moiety such as a diethylamino group, etc.), a halogen atom, a cyano group and a hydroxy group.

$B^1$ represents a hydrogen atom, an alkyl group, a substituted alkyl group, a substituted or unsubstituted aryl group, or a substituted or unsubstituted aralkyl group, and $B^2$ represents a hydrogen atom, an alkyl group, a substituted alkyl group, a substituted or unsubstituted aryl group, an aralkyl group, an acyl group of the formula —$COR^3$ (where $R^3$ represents an alkyl group, a substituted alkyl group, a substituted or unsubstituted aralkyl group or a substituted or unsubstituted aryl group), an alkylsulfonyl group, a substituted alkylsulfonyl group or an arylsulfonyl group. When both $B^1$ and $B^2$ represent alkyl groups, alkyl groups containing 1 to 8 carbon atoms (more preferably 1 to 4 carbon atoms) are preferred. When both $B^1$ and $B^2$ represent substituted alkyl groups, substituted alkyl groups whose alkyl moieties have 1 to 8 (more preferably 1 to 4) carbon atoms are preferred. Examples of substituents for the substituted alkyl groups include a sulfamoyl group represented by the formula of —$SO_2NR^4R^5$ (wherein $R^4$ represents a hydrogen atom, an alkyl group (e.g., having 1 to 4 carbon atoms) or a substituted alkyl group (e.g., a $C_{1-4}$ alkyl group substituted by an alkoxy group (preferably having 1 to 4 carbon atoms), a hydroxy group, a halogen atom (e.g., F, Cl, Br, I), a cyano group, etc.) and $R^5$ represents a hydrogen atom, an alkyl group (e.g., having 1 to 4 carbon atoms), a substituted alkyl group (e.g., a $C_{1-4}$ alkyl group substituted by an alkoxy group (preferably having 1 to 4 carbon atoms), a hydroxy group, a halogen atom (e.g., F, Cl, Br, I), a cyano group, etc.), an aralkyl or a substituted or unsubstituted aryl group (e.g., having 6 to 10 carbon atoms); or $R^4$ and $R^5$ may combine with each other directly or through an oxygen atom to form a ring), a carbamoyl group represented by the formula —$CONR^4R^5$ (wherein $R^4$ and $R^5$ each has the same meaning as described above), sulfonamido groups represented by the formula —$NHSO_2R^3$ (wherein $R^3$ has the same meaning as described above), carbonamido groups represented by the formula —NH-$COR^3$ (wherein $R^3$ has the same meaning as described above), a cyano group, an alkoxy group (preferably having 1 to 4 carbon atoms), a halogen atom (throughout this specification the term halogen atom includes fluorine, chlorine, bromine, and iodine with a preference for chlorine), a substituted phenyl group, an alkyl- or aryl-sulfonyl group, etc. Examples of the substituent for the phenyl group are a halogen atom (F, Cl, Br, I), an alkyl group preferably having 1 to 4 carbon atoms, an alkoxy group preferably having 1 to 4 carbon atoms and a cyano group. Preferred examples of $R^3$ in the —$COR^3$ group represented by $B^2$ include alkyl groups having 1 to 8 (preferably 1 to 4) carbon atoms, substituted alkyl groups whose alkyl moieties have 1 to 8 (preferably 1 to 4) carbon atoms, a phenyl group and substituted phenyl groups having 6 to 9 carbon atoms.

D represents a hydrogen atom, an alkyl group, a substituted alkyl group, an alkoxy group, a substituted alkoxy group or a halogen atom.

E represents a hydrogen atom, a trifluoromethyl group, a carboxylic acid ester group represented by the formula —$COOR^3$ (wherein $R^3$ is defined as above), a nitro group, a halogen atom, an alkyl group (e.g., having 1 to 4 carbon atoms), a substituted alkyl group (e.g., a $C_{1-4}$ alkyl group substituted by an alkoxy group (preferably having 1 to 4 carbon atoms), a hydroxy group, a halogen atom (e.g., F, Cl, Br, I), a cyano group, etc.), an alkoxy group (e.g., having 1 to 4 carbon atoms), a substituted alkoxy group (e.g., a $C_{1-4}$ alkoxy group substituted by an alkoxy group (preferably having 1 to 4 carbon atoms), a hydroxy group, a halogen atom (e.g., F, Cl, Br, I), a cyano group, etc.), an alkylsulfonyl group (e.g., having 1 to 4 carbon atoms in the alkyl moiety), a substituted alkylsulfonyl group, an arylsulfonyl group (e.g., having 6 to 10 carbon atoms in the aryl moiety), an alkylcarbonyl group (e.g., having 1 to 4 carbon atoms in the alkyl moiety), a substituted alkylcarbonyl group, a sulfonamido group represented by the formula of $-NHSO_2R^3$ (wherein $R^3$ is defined above), a carbonamido group represented by the formula of $-NHCOR^3$ (wherein $R^3$ is defined above), a sulfamoyl group represented by the formula of $-SO_2NR^4R^5$ (wherein $R^4$ and $R^5$ are defined as above) or a carbamoyl group represented by the formula of $-CONR^4R^5$ (wherein $R^4$ and $R^5$ are defined as above).

M represents a hydrogen atom, an alkyl group, a substituted alkyl group, an alkoxy group, a substituted alkoxy group, a halogen atom, a sulfamoyl group represented by the formula of $-SO_2NR^4R^5$ or a carbamoyl group represented by the formula of $-CONR^4R^5$ (wherein $R^4$ and $R^5$ are defined as above).

In case that E or M is the sulfamoyl group represented by the formula of $-SO_2NR^4R^5$ and the carbamoyl group represented by the formula of $-CONR^4R^5$, preferred examples of $R^4$ include a hydrogen atom, alkyl groups having 1 to 8 (preferably 1 to 4) carbon atoms and which can be straight chain, branched chain or cyclic and substituted alkyl groups whose alkyl moieties have 1 to 8 (preferably 1 to 4) carbon atoms. Preferred examples of $R^5$ are a hydrogen atom, alkyl groups having 1 to 8 (preferably 1 to 4) carbon atoms and which can be straight chain, branched chain or cyclic, substituted alkyl groups whose alkyl moieties have 1 to 8 (preferably 1 to 4) carbon atoms, a benzyl group, a phenyl group and a substituted phenyl group having 6 to 9 carbon atoms. In addition, $R^4$ and $R^5$ may combine directly or through an oxygen atom to form a 5- or 6-membered saturated, unsaturated or aromatic ring (e.g., an N-morpholinosulfamoyl group or an N-morpholinocarbamoyl group). Of the aforementioned examples, the case where both $R^4$ and $R^5$ are hydrogen atoms, and the case at least one of $R^4$ or $R^5$ is a hydrogen atom and the other is an alkyl group having 1 to 4 carbon atoms are particularly preferred from the standpoint of the easy and economical availability and the high transferability of the dye moiety.

When D, E or M represents a substituted or unsubstituted alkyl group, the alkyl moiety has preferably 1 to 8 (more particularly 1 to 4) carbon atoms and is straight or branched chain. Examples of the substituents for the substituted alkyl groups represented by D, E or M and further, by the above-described $R^3$, $R^4$ and $R^5$ include a cyano group, an alkoxy group (preferably having 1 to 4 carbon atoms), a hydroxyl group, a carboxy group, a sulfo group, a halogen atom, etc. In addition, other examples of the substituents for the substituted alkyl groups $R^3$, $R^4$ and $R^5$ include sulfonamide groups represented by $-NHSO_2R^3$, carbonamido groups represented by $-NHCOR^3$ (where $R^3$ is defined as above), sulfamoyl groups represented by $-SO_2NR^4R^5$, carbamoyl groups represented by $-CONR^4R^5$ (where $R^4$ and $R^5$ are defined as above) and so on.

Examples of the substituents for the substituted phenyl groups represented by $R^3$ and $R^5$, respectively, include a hydroxy group, a halogen atom, a carboxy group, a sulfo group, a sulfamoyl group, a carbamoyl group, a sulfonamido group, a carbonamido group, etc.

Preferred examples of aryl groups represented by $B^1$, $B^2$ and $R^3$, respectively, include a phenyl group and substituted phenyl groups (representative substituents include an alkyl group having 1 to 4 carbon atoms, a substituted alkyl group, an alkoxy group having 1 to 4 carbon atoms, a substituted alkoxy group, a halogen atom, a cyano group, a sulfamoyl group, a carbamoyl group, etc.). Representative substituents for the substituted alkyl group and the substituted alkoxy group include an alkoxy group (preferably having 1 to 4 carbon atoms), a halogen atom (e.g., F, Cl, Br, I) and a cyano group. Of these aryl groups, a phenyl group is particularly preferred.

Preferable examples of the aralkyl groups represented by $B^1$, $B^2$ and $R^3$, respectively, include a benzyl group, substituted benzyl groups (whose substituents include an alkyl group having 1 to 4 carbon atoms, an alkoxy group having 1 to 4 carbon atoms, a halogen atom, a hydroxy group, a cyano group, etc.) and a phenethyl group. Of these groups, a benzyl group is particularly preferred.

As a halogen atom represented by D, E or M, a chlorine atom is particularly preferred but fluorine, iodine and bromine are also useful.

As the alkoxy group and substituted alkoxy groups represented by D, E or M, those which have an alkyl moiety containing 1 to 8 (preferably 1 to 4) carbon atoms are preferred. Examples of the substituents for the substituted alkoxy groups represented by D, E or M, respectively, include an alkoxy group preferably having 1 to 4 carbon atoms; a dialkylamino group whose alkyl moieties each have preferably 1 to 4 carbon atoms; a halogen atom; a cyano group; and a hydroxy group.

m and q each represents 0 or 1.

X represents a divalent group of the formula of $-A_1-(T)_n-(A_2)_p-$ wherein $A_1$ and $A_2$ may be the same or different and each represents an alkylene group or an arylene group. The alkylene group can be straight chain or branched chain and have 1 to 6 carbon atoms. The arylene group can have 6 to 10 carbon atoms for which a phenylene group is representative. T represents a divalent group selected from an oxy group, a carbonyl group, a carboxyamido group, a carbamoyl group, a sulfonamido group, a sulfamoyl group and a sulfonyl group; and n and p may be the same or different and each represents 0 or 1.

Z represents a hydrogen atom, a straight chain or branched chain substituted or unsubstituted alkyl group preferably having 1 to 6 carbon atoms, wherein a hydrogen atom is preferred. Representative substituents for the substituted alkyl group include an alkoxy group (preferably having 1 to 4 carbon atoms), a halogen atom (e.g., F, Cl, Br, I) and a cyano group.

More preferably dye-providing compounds correspond to the cases that q represents zero and Y-X- represents Y-alkylene-NHSO$_2$- or Y-arylene-NHSO$_2$- in the above-described general formulae (I) and (II) wherein the alkylene group preferably has 2 to 6 carbon atoms and the arylene group preferably has 6 to 10 carbon atoms. Therein, the arylene group includes a phenylene group or a substituted phenylene group having as a substituent an alkyl group preferably having 1 to 4 carbon atoms, an alkoxy group preferably having 1 to 4 carbon atoms, an alkoxyalkoxy group preferably having 3 to 6 carbon atoms, etc.

Particularly preferred dye-providing compounds correspond to the cases that m represents zero in the above-described formulae (I) and (II) from the standpoint of the diffusion speed of dyes released.

L represents an alkylene group or an arylene group such as described above for X. The alkylene group represented by L may be straight chain or branched chain, and has preferably 1 to 8 carbon atoms (more preferably 1 to 4 carbon atoms). l represents 1 or 0.

Y represents a diffusibility controlling moiety, that is to say, a moiety which can provide an azo dye compound differing in diffusibility from an azo dye image-forming compound represented by the above-described formula (I) or (II) as a result of the developing treatment under an alkaline condition.

As an example of the compound represented by the general formula (I) or (II), mention may be made of a nondiffusible dye-providing compounds (dye releasing redox compounds) which can provide a diffusible dye through self-cleanage oxidation thereof upon development. The diffusibility controlling moiety Y for this type compound is an N-substituted sulfamoyl group. As an example of the moiety Y, mention may be made of a moiety represented by the following formula (A):

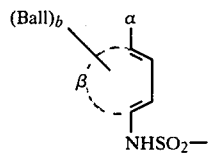

Therein, $\beta$ represents the nonmetal atoms necessary to form a benzene ring, which benzene ring may be condensed with a carbocyclic ring or a heterocyclic ring to form a condensed ring such as a naphthalene ring, a quinoline ring, 5,6,7,8-tetrahydronaphthalene ring, a chroman ring and so on. Further, the above-described benzene ring or the condensed ring may be substituted with a halogen atom, an alkyl group, an alkoxy group, an aryl group, an aryloxy group, a nitro group, an amino group, an alkylamino group, an arylamino group, amido group, a cyano group, an alkylmercapto group, a keto group, a carboalkoxy group, a hetero ring residue (to which some substituents may be attached) or so on.

$\alpha$ represents a group of the formula $-OG^1$ or $-NHG^2$. Therein, $G^1$ represents a hydrogen atom or a group capable of producing a hydroxy group when hydrolized (a hydrolyzable group), with preferable examples including groups represented by the formula

and groups represented by the formula

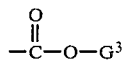

(wherein $G^3$ represents an alkyl group having 1 to 18 carbon atoms particularly methyl, ethyl, propyl, etc.; a halogen substituted alkyl group having 1 to 18 carbon atoms such as chloromethyl, trifluoromethyl, etc.; a phenyl group or a substituted phenyl group). On the other hand, $G^2$ represents a hydrogen atom, an alkyl group having 1 to 22 carbon atoms or a hydrolyzable group. Preferred examples of the hydrolyzable group represented by $G^2$ include a group of the formula

a group of the formula $-SO_2G^5$ and $-SOG^5$. Therein, $G^4$ represents an alkyl group containing 1 to 4 carbon atoms such as a methyl group; a halogen substituted alkyl group such as a mono-, di- or tri-chloromethyl group, or a trifluoromethyl group; an alkylcarbonyl group such as an acetyl group; an alkyloxy group; a substituted phenyl group such as a nitrophenyl or a cyanophenyl group; a phenyloxy group per se or a phenyloxy group substituted with a lower alkyl group or a halogen atom; a carboxyl group; an alkyloxycarbonyl group; an aryloxycarbonyl group; an alkylsulfonylethoxy group; or an arylsulfonylethoxy group. On the other hand $G^5$ represents a substituted or an unsubstituted alkyl group or an aryl group.

In addition, b represents an integer of 0, 1 or 2. Therein, b must be 1 or 2 and is preferably 1 except when $\alpha$ represents the group $-NHG^2$ and $G^2$ contains a group (equivalent to an alkyl group) which renders the compound immobile and nondiffusible (i.e., b is 1 or 2 when $\alpha$ represents a group of the formula $-OG^1$ or a group of the formula $-NHG^2$ and $G^2$ represents a hydrogen atom, an alkyl group having 1 to 8 carbon atoms or a hydrolyzable group).

Ball represents a ballast group, which will be described in detail hereinafter.

Specific examples of the moiety Y of the above-described kind are described in Japanese Patent Applications (OPI) 50736/'78 and U.S. Pat. No. 3,928,312.

As another example of the moiety Y suitable for a dye releasing redox compound may be made represented by the following formula (B):

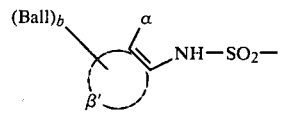

wherein Ball, $\alpha$ and b, respectively, have the same meanings as in the formula (A), and $\beta'$ represents atoms necessary to form a carbocyclic ring such as a benzene ring, which ring may be condensed with a carbocyclic ring or a heterocyclic ring to form a condensed ring system such as a naphthalene ring, a quinoline ring, 5,6,7,8-tetrahydronaphthalene ring, a chroman ring, etc. Further, each of the above-described rings may be substituted with a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, a heterocyclic ring (which may be further substituted), etc. Specific examples of the moiety Y of the above-described kind are described in Japanese Patent Application (OPI) 113624/'76, Japanese Patent Application 91187/'79, and U.S. Pat. No. 4,053,312 and 4,055,428.

As still another example of Y is a moiety represented by the formula (C):

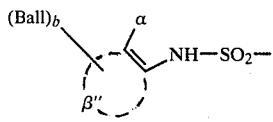

(C)

wherein Ball, b and α, respectively, have the same meanings as in the formula (A), and β″ represents the atoms necessary to form a heterocyclic ring such as a pyrazole ring, a pyridine ring or the like, which may be condensed with a carbocyclic ring or a heterocyclic ring. In addition, each of the above-described various rings may be substituted with the same kinds of substituents as described for the rings in the formula (B). Specific examples of this Y moiety are described in Japanese Patent Application (OPI) 104,343/'76.

As a further example of Y there is the moiety represented by the formula (D):

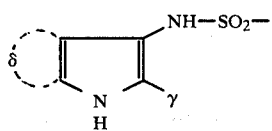

(D)

wherein γ preferably represents a hydrogen atom, or an alkyl group, an aryl group or a heterocyclic ring residue, which may be substituted or unsubstituted, or a —CO-G$^6$ group where G$^6$ represents —OG$^7$, —SG$^7$ or

(wherein G$^7$ represents a hydrogen atom, an alkyl group, a cycloalkyl group or an aryl group, which groups each may bear substituents; G$^8$ has the same definition as G$^7$ or an acyl group derived from an aliphatic or an aromatic carboxylic acid or from a sulfonic acid; and G$^9$ represents a hydrogen atom or a substituted or unsubstituted alkyl group); and δ represents the atoms necessary to complete a condensed benzene ring and further, the condensed benzene ring completed may bear one or more of substituents; and γ and/or the condensed benzene ring completed by the moiety δ must bear a ballast group or a group containing a ballast group. Specific examples of this Y moiety are described in Japanese Patent Applications (OPI) 104,343/'76; 130,122/'79 and 46,730/'78.

As another example of the Y moiety suitable for the compound, mention may be made of the moiety represented by the formula (E):

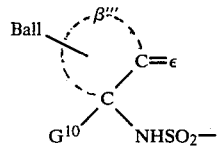

(E)

In the formula (E), Ball has the same meaning as in the formula (A), and ε represents an oxygen atom or =NG$^{11}$ (where G$^{11}$ represents a hydroxy group or an amino group which may be substituted). In case of ε=NG$^{11}$, the =C=N-G$^{11}$ group is formed by dehydration reaction of a carbonyl compound of the formula H$_2$N-G$^{11}$ with a ketone group. G$^{11}$ is determined by the compounds of the formula H$_2$N-G$^{11}$ employed as the carbonyl reagent. Representative examples are hydroxylamine, hydrazines, semicarbazides, thiosemicarbazides and the like. Specific examples of hydrazines include hydrazine; phenylhydrazine and substituted phenylhydrazines whose phenyl moiety bears a substituent such as an alkyl group, an alkoxy group, a carboalkoxy group, a halogen atom, etc.; isonicotinic acid hydrazide; and the like. Specific examples of semicarbazides include, by analogy to hydrazines, phenylsemicarbazide and substituted phenylsemicarbazides whose phenyl moiety bears a substituent such as an alkyl group, an alkoxy group, a carboalkoxy group, a halogen atom, etc., and specific examples of thiosemicarbazides also include various derivatives similar to those of the semicarbazides.

β‴ in the formula (E) represents the atoms necessary to form a 5-, 6- or 7-membered saturated or unsaturated non-aromatic hydrocarbon ring with specific examples including cyclopentanone, cyclohexanone, cyclohexenone, cyclopentenone, cycloheptanone, cycloheptenone and the like. In addition, the above-described non-aromatic hydrocarbon rings may be further fused with other carbocyclic, heterocyclic or aromatic rings at appropriate positions thereon to form a condensed system. However, when β‴ forms a condensed ring, a condensed ring formed by benzene and the above-described 5- or 7-membered non-aromatic hydrocarbon ring such as indanone, benzocyclohexenone, benzocycloheptenone and the like, is more desirable in the present invention.

The above-described 5- or 7-membered non-aromatic hydrocarbon rings and the above-described condensed rings may bear one or more substituents such as an alkyl group, an aryl group, an alkyloxy group, an aryloxy group, an alkylcarbonyl group, an arylcarbonyl group, an alkylsulfonyl group, an arylsulfonyl group, a halogen atom, a nitro group, an amino group, an alkylamino group, an arylamino group, an amido group, an alkylamido group, an arylamido group, a cyano group, an alkylmercapto group, an alkyloxycarbonyl group, etc.

G$^{10}$ represents a hydrogen atom or a halogen atom such as fluorine, chlorine, bromine or the like.

Specific examples of this Y moiety are described in Japanese Patent Application (OPI) 3,819/'78.

As other examples of the suitable Y moieties for diffusible dye providing compounds are described in U.S. Pat. Nos. 3,443,930, 3,443,939, 3,628,952, 3,844,785 and 3,443,943; etc.

Formulae (I) and (II) also represent non-diffusible, dye-providing compounds that can release a diffusible dye through self-ring-closure under an alkaline condition, but stops substantially releasing the dye as a result of the reaction with the oxidized developer. The diffusibility controlling Y moiety effective for these compounds can be represented by the following formula (F):

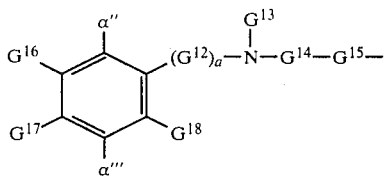  (F)

In the formula (F), α″ represents an oxidizable nucleophilic group such as a hydroxyl group, a primary or a secondary amino group, a hydroxyamino group, a sulfonamido group or the like, or the precursor thereof and is preferably a hydroxyl group.

α‴ represents a dialkylamino group or one of the groups defined in α″ and is preferably a hydroxyl group.

$G^{14}$ represents an electrophilic group such as —CO—, —CS— or the like, and is preferably —CO—.

$G^{15}$ represents an oxygen atom, a sulfur atom, a selenium atom, a nitrogen atom or the like, wherein the nitrogen atom may be substituted with a hydrogen atom, an unsubstituted or substituted alkyl group having 1 to 10 carbon atoms or an aryl group having 6 to 20 carbon atoms. An oxygen atom is preferred as $G^{15}$.

$G^{12}$ represents an alkylene group having 1 to 3 carbon atoms.

a represents 0 or 1 and preferably, 0.

$G^{13}$ represents a substituted or an unsubstituted alkyl group having 1 to 40 carbon atoms, or a substituted or an unsubstituted aryl group having 6 to 40 carbon atoms and is preferably an alkyl group.

$G^{16}$, $G^{17}$ and $G^{18}$ each represents a hydrogen atom, a halogen atom, a carbonyl group, a sulfamoyl group, a sulfonamido group, an alkyloxy group having 1 to 40 carbon or the same groups as defined for $G^{13}$. $G^{16}$ and $G^{17}$ may combine with each other to form a 5- to 7-membered ring. In addition, $G^{17}$ may represent

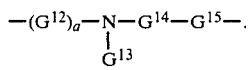

Therein, at least one of groups $G^{13}$, $G^{16}$, $G^{17}$ and $G^{18}$ must be a ballast group. Specific examples of this Y moiety are described in Japanese Patent Application (OPI) 63,618/'76 and U.S. Pat. No. 3,980,479.

Another example of the Y moiety suitable for the nondiffusible dye providing compound is represented by the formula (G):

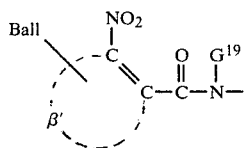  (G)

wherein Ball and β′ have the same meanings as defined in the formula (B), respectively, and $G^{19}$ represents an alkyl group (including substituted alkyl groups).

Specific examples of this Y moiety are described in Japanese Patent Application (OPI) 35,533/'78.

Still another example of the Y moiety suitable for the compounds of this invention is represented by the following general formula (H):

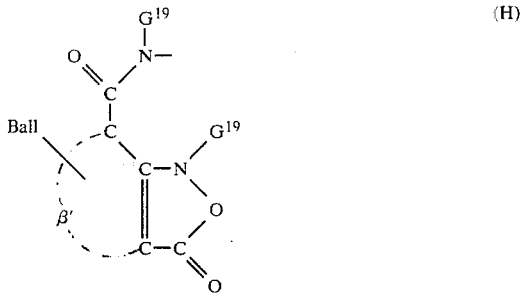  (H)

wherein Ball and β′ have the same meanings as defined in the formula (B), respectively, and $G^{19}$ has the same meaning as defined in the formula (G). Specific examples are described in Japanese Patent Application (OPI) 4,819/'77 and U.S. Pat. No. 3,421,964.

Still another type of compound represented by the general formula (I) is a nondiffusible compound which releases a diffusible dye at the time of the coupling reaction with the oxidation product of a color developer produced by oxidation of the developer with the optically exposed silver halide (dye releasing coupler). Representative examples of the Y moiety effective for dye releasing couplers are described in U.S. Pat. No. 3,227,550. A specific example of such a moiety Y is represented by the formula (J):

(Ball-Coup)$_t$-Link-  (J)

In the formula (J), Coup represents a coupler residue capable of coupling with the oxidation product of a color developer, with specific examples including a 5-pyrazolone coupler residue, a phenol coupler residue, a naphthol coupler residue, an indanone coupler residue and an open-chain ketomethylene coupler residue, and Ball represents a ballast group.

Link is attached to the active site of the Coup moiety and represents a group whose bond to the Coup moiety is split when the dye-providing compound undergoes coupling reaction with the oxidation product of the color developer used. Specific examples of Link include an azo group, an azoxy group, —O—, —Hg—, an alkylidene group, —S—, —S—S— and —NHSO$_2$.

t represents 1 or 2 when Link is an alkylidene group, or 1 when Link is one of the above-described groups other than an alkylidene group.

Preferred examples of the Y moiety represented by formula (J) include those which contain as the Coup moiety a phenol coupler residue, a naphthol coupler residue or an indanone coupler residue and contain an —NHSO$_2$— group as the Link group.

As an example of a further different type of the compound represented by the general formula (I) or (II), mention may be made of such a compound that it is diffusible under an initial alkaline condition, but it becomes nondiffusible when oxidized by a developing treatment (namely developer dye). Representative examples of the moiety Y effective for the compound of the above-described type are described in U.S. Pat. No. 2,983,606.

Of the above-described compounds, particularly desirable compounds for the use in the present invention are dye releasing redox compounds, and the most effective group as Y is an N-substituted sulfamoyl group. Preferable N-substituents of the N-substituted sulfamoyl group are a carbon ring residue and a hetero ring residue. As examples of the N-carbon ring-substituted sulfamoyl group, those which are represented by the formula (A) and the formula (B), respectively, are particularly preferred. As examples of the N-heterocyclic ring-substituted sulfamoyl group, those which are represented by the formula (C) and the formula (D), respectively, are particularly preferred.

Particularly preferred of the moieties represented by the formula (A) are illustrated below. Therein α is represented by —OG$^1$. G$^1$ represents a hydrogen atom or a group capable of producing a hydroxy group upon hydrolysis, for example, a group represented by

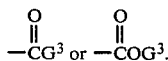

G$^3$ represents an alkyl group having 1 to 18 (particularly preferably 1 to 4) carbon atoms, a halogen substituted alkyl group having 1 to 18 (particularly preferably 1 to 4) carbon atoms, a phenyl group and a substituted phenyl group having 6 to 14 (preferably 6 to 10) carbon atoms. β represents nonmetal atoms necessary to form a benzene ring, wherein a naphthalene ring is particularly preferable as such a benzene ring. On such a naphthalene ring, a halogen atom, an alkyl group (having preferably 1 to 10 carbon atoms), an alkoxy group (having preferably 1 to 10 carbon atoms), a substituted alkyl group (having preferably 1 to 10 carbon atoms), a phenyl group, a substituted phenyl group (having preferably 6 to 10 carbon atoms), a naphthyl group, a substituted naphthyl group (having preferably 10 to 14 carbon atoms), a phenoxy group, a substituted phenoxy group (having preferably 6 to 10 carbon atoms), a naphthyloxy group, a substituted naphthyloxy group (having preferably 10 to 14 carbon atoms), a nitro group, an amino group, a mono- or di-alkylamino group (having preferably 1 to 10 carbon atoms), a mono- or di-substituted alkylamino group (having preferably 1 to 10 carbon atoms), an arylamino group (having preferably 6 to 14 carbon atoms), an amido group (having preferably 1 to 10 carbon atoms), a cyano group, an alkylthio group (having preferably 1 to 10 carbon atoms), a keto group (having preferably 2 to 11 carbon atoms), a carboalkoxy group (having preferably 2 to 11 carbon atoms) or a hetero ring residue (which hetero ring is constituted by preferably 3 to 10 atoms) may be substituted in addition to a ballast group. Ball represents a ballast group, and b is preferably 1.

Particularly preferred of the moieties represented by the general formula (B) are illustrated below. Therein, α is preferably —OG$^1$ and G$^1$ represents a hydrogen atom or a group capable of producing a hydroxy group upon hydrolysis such as

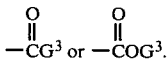

Therein, G$^3$ represents an alkyl group having 1 to 18 carbon atoms and more preferably, having 1 to 4 carbon atoms; a halogen substituted alkyl group having 1 to 18 carbon atoms and more particularly having 1 to 4 carbon atoms; a phenyl group; or a substituted phenyl group having 6 to 14 carbon atoms and preferably, having 6 to 10 carbon atoms. β' represents the nonmetal atoms necessary to form a benzene ring. On this benzene ring, in addition to a ballast group, a wide variety of group may be substituted. Specific examples of such a substituent include a halogen atom, an alkyl group (having preferably 1 to 10 carbon atoms), an alkoxy group (having preferably 1 to 10 carbon atoms), a phenyl group, a substituted phenyl group (having preferably 6 to 11 carbon atoms), an aryloxy group (having preferably 6 to 11 carbon atoms), a nitro group, an amino group, an alkylamino group (having preferably 1 to 10 carbon atoms), an arylamino group (having preferably 6 to 11 carbon atoms), an amido group, a cyano group, an alkylthio group (having preferably 1 to 10 carbon atoms), a keto group (having preferably 2 to 11 carbon atoms), a carboalkoxy group (having preferably 2 to 11 carbon atoms), a heterocyclic ring residue, etc. Ball represents a ballast group, and b is preferably 1.

Particularly preferred of the moieties represented by the formula (C) are illustrated below. Therein, α is preferably a hydroxy group, but it may be a group capable of producing a hydroxy group upon the hydrolysis such as a group represented by

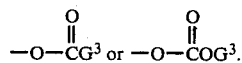

G$^3$ in such groups represents an alkyl group having 1 to 18 carbon atoms and particularly 1 to 4 carbon atoms; a halogen substituted alkyl group having 1 to 18 carbon atoms and particularly 1 to 4 carbon atoms; a phenyl group; or a substituted phenyl group having 6 to 14 carbon atoms and particularly 6 to 10 carbon atoms. β" represents atoms necessary to form a pyrazole ring. On such a pyrazole ring, a halogen atom, an alkyl group (having preferably 1 to 10 carbon atoms), an alkoxy group (having preferably 1 to 10 carbon atoms), a substituted alkyl group (having preferably 1 to 10 carbon atoms), a phenyl group, a substituted phenyl group (having preferably 6 to 10 carbon atoms), a phenoxy group, a substituted phenoxy group (having preferably 6 to 10 carbon atoms), a naphthyl group, a substituted naphthyl group (having preferably 10 to 14 carbon atoms), a naphthyloxy group, a substituted naphthyloxy group (having preferably 10 to 14 carbon atoms), a nitro group, an amino group, a mono- or di-alkylamino group (having preferably 1 to 10 carbon atoms), a mono- or di-substituted alkylamino group (having preferably 1 to 10 carbon atoms), an arylamino group (having preferably 6 to 14 carbon atoms), an amido group (having preferably 1 to 10 carbon atoms), a cyano group, an alkylthio group (having preferably 1 to 10 carbon atoms), keto group (having preferably 2 to 11 carbon atoms), a carboalkoxy group (having preferably 2 to 11 carbon atoms) or a hetero ring (which is constituted by preferably 3 to 10 atoms) may be substituted in addition to a ballast group (Ball). b is preferably 1.

In particularly preferred moieties represented by the general formula (D), γ is —COG$^6$ and G$^6$ represents —OG$^7$, —SG$^7$ or

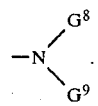

Therein, G$^7$ represents a hydrogen atom, or an alkyl group having 1 to 32 carbon atoms (e.g., methyl, ethyl, isopropyl, n-octadecyl, etc.), a cycloalkyl group (e.g., cyclohexyl, etc.) or an aryl group (e.g., phenyl, etc.), which groups each may bear substituents. Specifically, the alkyl group may be substituted by a hydroxyl group, an alkoxy group, an aryloxy group, a halogen atom, a carboxyl group or a sulfo group, and the alkyl group may bear a substituent such as a halogen atom, an alkyl group, an alkoxy group, a dialkylamino group, an acylamino group, a carboxyl group or a sulfo group.

$G^8$ represents one of the groups defined for $G^7$, or an acyl group derived from an aliphatic or an aromatic carboxylic acid or sulfonic acid. $G^9$ represents a hydrogen atom or an unsubstituted or substituted alkyl group having 1 to 32 carbon atoms.

The aforementioned condensed benzene ring completed by the moiety $\delta$ may have one or more substituents. Specific examples of such a substituent include a halogen atoms (such as chlorine, bromine, etc.); an alkyl group having 1 to 32 carbon atoms (for example, a methyl group, a butyl group, a hexadecyl group, etc.); an aryl group (for example, a phenyl group), which aryl group may have a substituent such as a halogen atom, an alkyl group, an alkoxy group, a dialkylamino group and an acylamino group; an aralkyl group (for example, benzyl group); a cycloalkyl group (for example, a cyclohexyl group); an alkoxy group (for example, a methoxy group, an ethoxy group, a dodecyloxy group, a hexadecyloxy group or the like); an aralkoxy group (for example, a benzyloxy group); an acylamino group or an acyl group (which acyl moiety or group may be derived from an aliphatic or an aromatic carboxylic acid or sulfonic acid); a cyano group; a sulfo group; a carboxyl group; a sulfamoyl group or a carbamoyl group (one or more of a hydrogen atom attached to the nitrogen atom of which may be replaced by a group such as an alkyl group); or $\delta$ represents the atoms necessary to complete a condensed carbon cyclic or heterocyclic ring, etc.

On the occasion that the above-described condensed benzene ring completed by the moiety $\delta$ has plural substituents, all of these substituents do not need to be the same.

The dye releasing redox compounds employed in embodiments of the present invention must not diffuse into adjacent photographic layers before development. For this purpose, such compounds have ballast groups in, for example, the residue $G^6$ or the substituents on the aforementioned condensed benzene rings completed by the $\delta$ moieties.

Even in the case that the substituent on the aforementioned condensed benzene ring completed by the moiety $\delta$ or the residue $G^6$ does not contain a long chain alkyl group, it is feasible for the aforementioned dye releasing redox compounds to possess satisfactory diffusion resisting property. The size of the molecule of the redox compound can be controlled so as to be sufficiently large, compared with the size of the aforementioned dye residue, by choosing the size of the condensed benzene ring properly. Further, sufficiently high diffusion resistance can be imparted to the dye releasing redox compound by choosing a sufficiently large-sized ballast group, as well.

On the occasion that the substituent on the condensed benzene ring in the aforementioned indole moiety or the $G^6$ group is a divalent group, it may be the group connecting one indole ring to the other indole ring. Specific examples of the dye releasing redox compounds of this type are illustrated below:

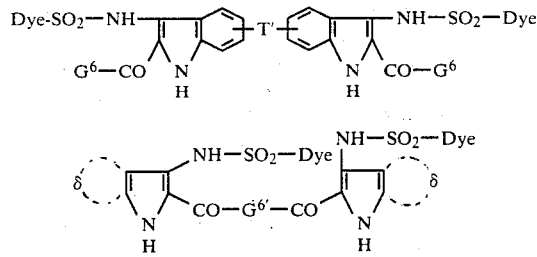

wherein Dye represents a moiety corresponding to formula (I) or (II) with the exclusion of the moiety Y from the formula (I) or (II), T' represents a divalent substituent on the benzene ring completed by the moiety $\delta$ such as an alkylene group, an arylene group, a divalent substituent of the alkoxy group, etc., and $G^{6'}$ represents a divalent counterpart of the $G^6$ group.

Similarly, in cases of other dye-releasing type image-forming compounds, two molecules of such a compound can be also connected by the group T'.

The ballast group is an organic ballast group capable of rendering the dye releasing redox compound nondiffusible during development in an alkaline processing solution and preferably has a hydrophobic moiety having 8 to 40 carbon atoms. Such an organic ballast group is bonded to the dye releasing redox compound directly or through a bridging group, for example, an imino bond, an ether bond, a thioether bond, a carbonamido bond, a sulfonamido bond, an ureido bond, an ester bond, an imido bond, a carbamoyl bond, a sulfamoyl bond, or like bond alone or in combination.

Specific examples of ballast groups are set forth below. They are an alkyl group or an alkenyl group (for example, a dodecyl group, an octadecyl group, etc.), an alkoxyalkyl group (for example, a 3-(octyloxy)propyl group, a 3-(2-ethylundecyloxy)propyl group, etc., as described in Japanese Patent Publication 27,563/'64), an alkylaryl group (for example, a 4-nonylphenyl group, a 2,4-di-tert-butylphenyl group, etc.), an alkylaryloxyalkyl group (for example, a 2,4-di-tert-pentylphenoxymethyl group, an α-(2,4-di-tert-pentylphenoxy)propyl group, a 1-(3-pentadecylphenoxy)ethyl group, etc.), an acylamidoalkyl group (for example, a 2-(N-butylhexadeconeamido)ethyl group, groups as described in U.S. Pat. Nos. 3,337,344 and 3,418,129; etc.), an alkoxyaryl or aryloxyaryl group (for example, a 4-(n-octadecyloxy)phenyl group, a 4-(4-n-dodecylphenyloxy)phenyl group, etc.), a residue having both a long-chain aliphatic group (which may be a long-chain alkyl or alkenyl group) and a group capable of rendering the residue soluble in water such as a carboxyl group or a sulfamoyl group (for example, a 1-carboxymethyl-2-nonanedecenyl group, a 1-sulfoheptadecyl group, etc.), an alkyl group substituted with an ester group (for example, a 1-ethoxycarbonylheptadecyl group, a 2-(n-dodecyloxycarbonyl)ethyl group, etc.), an alkyl group substituted with an aryl group or a heterocyclic group (for example, a 2-[4-(3-methoxycarbonylheneicosaneamido)-phenyl]-ethyl group, a 2-[4-(2-n-octadecylsuccinimido)-phenyl]ethyl group, etc.), and an aryl group substituted with an aryloxyalkoxycarbonyl group (for example, a 4-[2-(2,4-di-tert-pentylphenoxy)-2-methylpropyloxycarbonyl]phenyl group, etc.).

Of the above-described organic ballast groups, those which are bonded to bridging groups as represented in the following general formulae are particularly preferred.

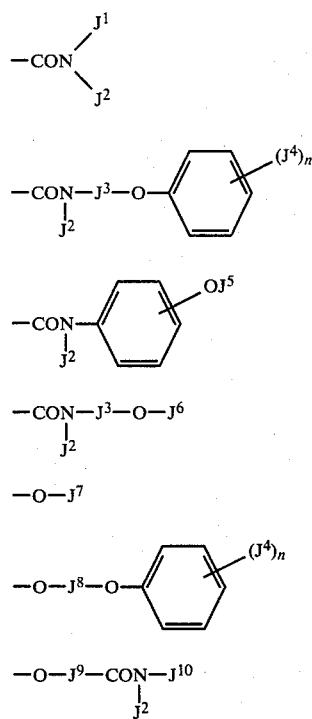

(Ball-I)
(Ball-II)
(Ball-III)
(Ball-IV)
(Ball-V)
(Ball-VI)
(Ball-VII)

Therein, $J^1$ represents a straight chain or branched chain alkyl group having 7 to 39 carbon atoms and preferably, having 7 to 32 carbon atoms (for example, a dodecyl group, a tetradecyl group, a hexadecyl group, etc.); $J^2$ represents a hydrogen atom or a straight or branched chain alkyl group having 1 to 39 carbon atoms and preferably 1 to 32 carbon atoms; $J^3$ represents a straight chain or branched chain alkylene group having 1 to 10 carbon atoms and preferably, 1 to 6 carbon atoms (for example, a propylene group, a butylene group, etc.); $J^4$ represents a hydrogen atom or a straight chain or branched chain alkyl group having 1 to 32 carbon atoms and preferably 1 to 25 carbon atoms (for example, a tert-amyl group, a pentadecyl group, etc.); $J^5$ represents a straight chain or branched chain alkyl group having 1 to 33 carbon atoms and preferably 1 to 25 carbon atoms or a group

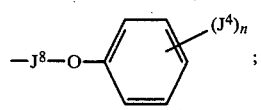

$J^6$ represents a straight chain or branched chain alkyl group having 1 to 37 carbon atoms and preferably 1 to 25 carbon atoms; $J^7$ represents an alkyl group having 8 to 40 carbon atoms and preferably 8 to 32 carbon atoms; $J^8$ represents a straight chain or branched chain alkylene group having 1 to 10 carbon atoms and preferably 1 to 6 carbon atoms; $J^9$ represents a straight chain or branched chain alkylene group having 1 to 38 carbon atoms and preferably 1 to 30 carbon atoms; $J^{10}$ represents an alkyl group having 1 to 38 carbon atoms and preferably 1 to 30 carbon atoms or a group

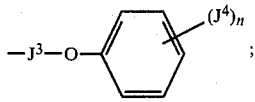

and n represents an integer of 1 to 5 (preferably 1 or 2).

Specific examples of the sulfamoyl group represented by the formula (A) are illustrated below.

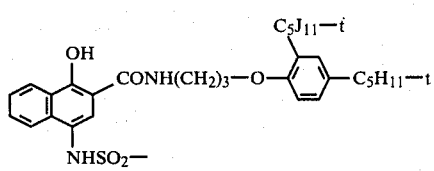

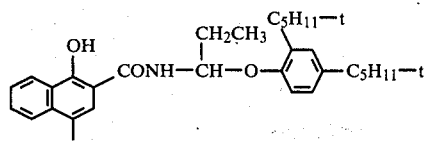

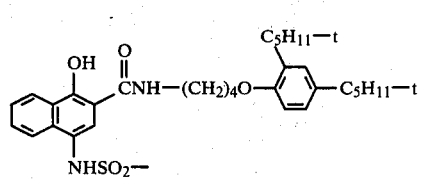

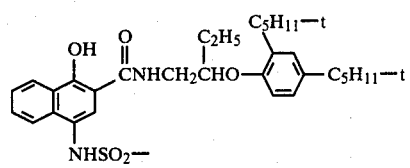

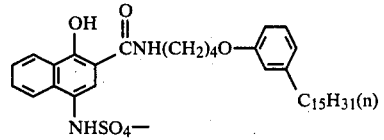

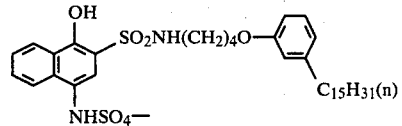

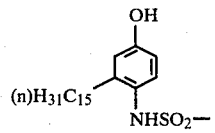

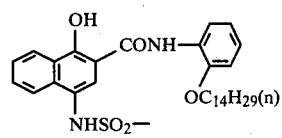

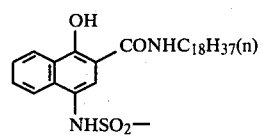

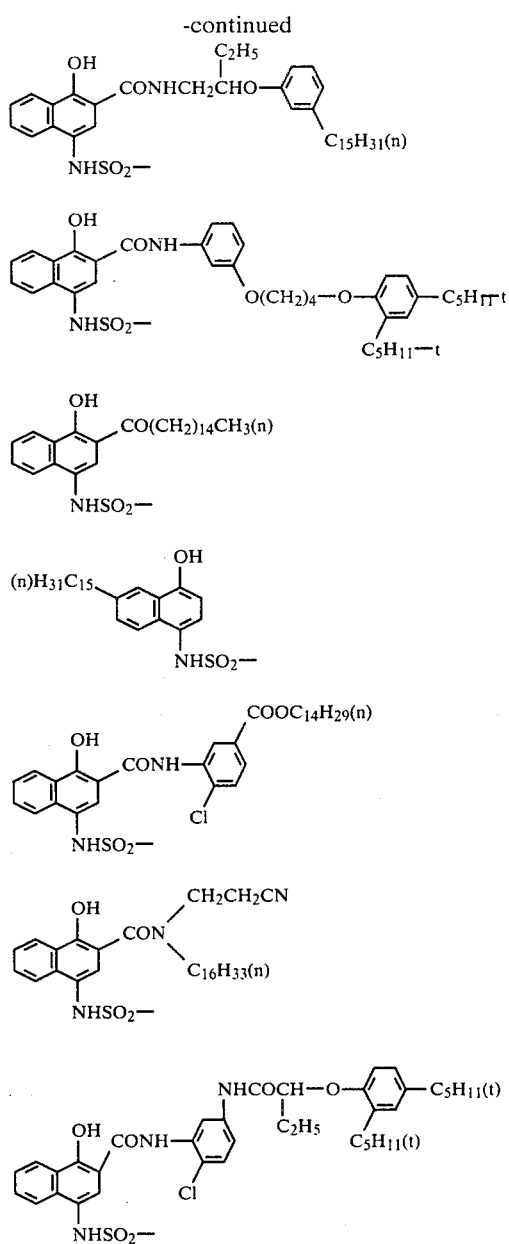
Specific examples of the sulfamoyl group represented by the formula (B) are illustrated below.
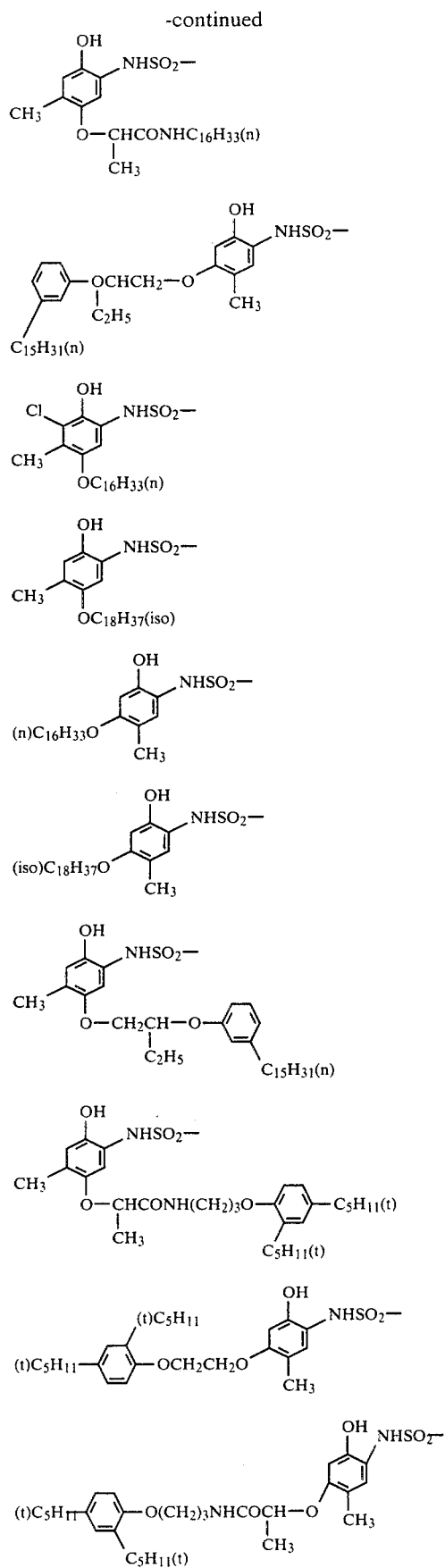

Furthermore, the groups described in U.S. Pat. No. 4,135,929 and *Research Disclosure,* Vol. 130, No. 13024 (February 1975) are also effective for the moiety Y.

Specific examples of the moiety Y represented by the formula (D) are illustrated below.

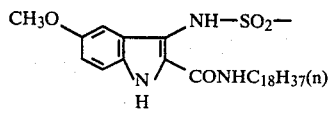

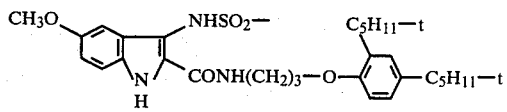

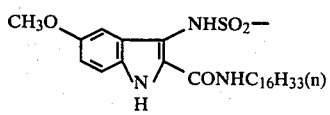

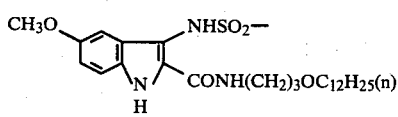

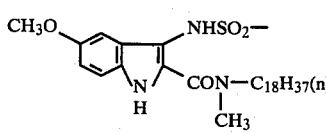

A more preferable compound according to the present invention is a compound having the above-described formula (I) or (II) in which $R^1$ represents $-CH_2CH_2-$; $R^2$ represents a straight chain or branched chain alkyl group having 1 to 4 carbon atoms (for example, a methyl group, an ethyl group, an n-propyl group, an isopropyl group, an n-butyl group, etc.); $B^1$ and $B^2$, which may be the same or different, each represents a straight chain or branched chain alkyl group having 1 to 4 carbon atoms (for example, a methyl group, an ethyl group, an n-propyl group, an n-butyl group, etc.) or a straight chain or branched chain alkyl group whose alkyl moiety has 1 to 4 carbon atoms and is substituted with a cyano group, an alkoxy group, a hydroxy group, a carboxy group, a sulfo group, a halogen atom, a sulfamoyl group represented by $-SO_2NR^4R^5$ (wherein $R^4$ and $R^5$ have the same meanings as defined above), a carbamoyl group represented by $-CONR^4R^5$ (wherein $R^4$ and $R^5$ have the same meanings as defined above), a sulfonamido group represented by $-NHSO_2R^3$ (wherein $R^3$ has the same meaning as defined above) and a carbonamido group represented by $-NHCOR^3$ (wherein $R^3$ has the same meaning as defined above); D represents a hydrogen atom, a straight chain or branched chain alkyl group having 1 to 4 carbon atoms (for example, a methyl group, an ethyl group, an n-propyl group, an n-butyl group, etc.), a straight chain or branched chain alkoxy group having 1 to 4 carbon atoms (for example, a methoxy group, an ethoxy group, etc.) or a halogen atom; E represents a hydrogen atom, a trifluoromethyl group, a straight chain or branched chain alkyl group having 1 to 4 carbon atoms (for example, a methyl group, an ethyl group, an n-propyl group, an n-butyl group, etc.), a nitro group, a halogen atom, a sulfamoyl group represented by $-SO_2NR^4R^5$ (wherein $R^4$ and $R^5$ may be the same or different and represent an alkyl group having 1 to 4 carbon atoms or a substituted alkyl group having 1 to 4 carbon atoms in the alkyl moiety, substituted with a cyano group, an alkoxy group, a hydroxy group, a carboxy group, a sulfo group, etc., and further, $R^4$ and $R^5$ may be bonded to each other directly or through an oxygen atom to form a 5- or 6-membered ring) or a carbamoyl group represented by $-CONR^4R^5$ (wherein $R^4$ and $R^5$ have the same meanings as described immediately above); Y-X represents Y-alkylene-$NHSO_2-$ or Y-arylene-$NHSO_2-$, and Y represents a sulfamoyl group represented by the general formula (A), (B), (C) or (D); m represents 0 or 1, and preferably 0; q is 0; L represents a straight chain or branched chain alkylene group having 1 to 4 carbon atoms (for example, a methylene group, an ethylene group, an n-propylene group, an n-butylene group, etc.) or a phenylene group; and M represents a sulfamoyl group represented by $-SO_2NR^4R^5$ (wherein $R^4$ and $R^5$ have the same meanings as described immediately above).

A particularly preferred compound according to the present invention is a compound represented by the above-described formula (I) or (II) in which $R^1$ represents $-CH_2CH_2-$;

$R^2$ represents a straight chain alkyl group having 1 to 4 carbon atoms:

$B^1$ and $B^2$, which may be the same or different, each represents a straight chain alkyl group having 1 to 4 carbon or a straight chain substituted alkyl group having 1 to 4 carbon atoms in the alkyl moiety substituted with a cyano group, a hydroxy group or a halogen atom, or a sulfamoyl group, a carbamoyl group, a sulfonamido group or a carbonamido group as described immediately above: D and E, which may be the same or different, each represents a hydrogen atom, a methyl group, an ethyl group, a methoxy group, an ethoxy group or a halogen atom;

Y-X represents Y-arylene-$NHSO_2-$, and Y represents a sulfamoyl group represented by the general formula (A), (B), (C) or (D);

m represents 0 or 1;

q represents 0;

L represents a straight chain alkylene group having 1 to 4 carbon atoms; and

M represents $-SO_2NR^4R^5$ (wherein $R^4$ and $R^5$ which may be the same or different each represents a hydrogen atom, a methyl group or an ethyl group).

Specific examples of the dye releasing redox compounds according to the present invention are illustrated below:

Compound 1

Compound 2

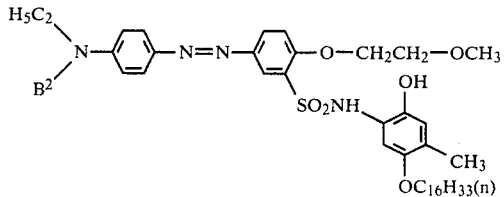

wherein $B^2$ is $C_2H_5$

Compound 3
$B^2$ is $C_3H_6$ in Compound 1

Compound 5
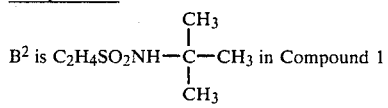 in Compound 1

Compound 7
$B^2$ is $C_2H_4NHSO_2C_4H_9(n)$ in Compound 1

Compound 9
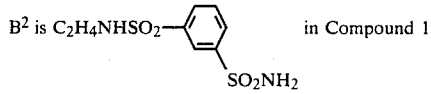 in Compound 1

Compound 11
$B^2$ is $C_2H_4SO_2NH_2$ in Compound 10

Compound 13
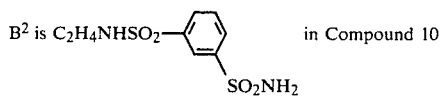 in Compound 10

Compound 15
$B^1$ and $B^2$ each is $C_2H_4Cl$ in Compound 14

Compound 17
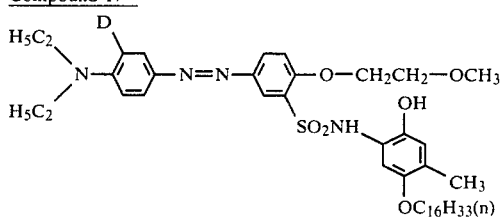

(wherein D is $CH_3$)

Compound 19
D is Cl in Compound 17

Compound 21

-continued $B^2$ is $CH_3$ in Compound 1

Compound 4
$B^2$ is $C_2H_4SO_2NH_2$ in Compound 1

Compound 6
$B^2$ is $C_2H_4NHSO_2CH_3$ in Compound 1

Compound 8
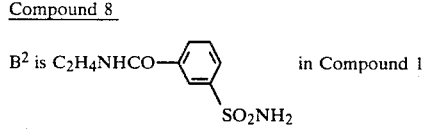 in Compound 1

Compound 10
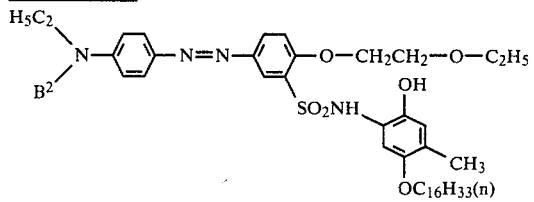

(wherein $B^2$ is $C_2H_5$)

Compound 12
$B^2$ is $C_2H_4NHSO_2CH_3$ in Compound 10

Compound 14
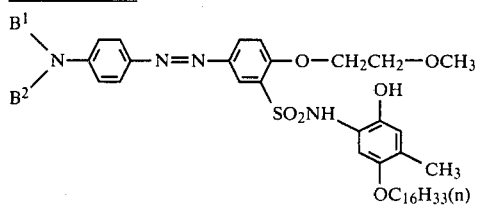

(wherein $B^1$ and $B^2$ each is $C_2H_4OH$)

Compound 16
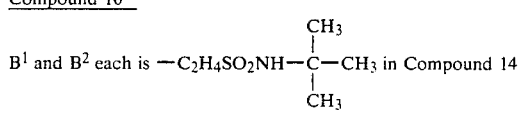 in Compound 14

Compound 18
D is $OCH_3$ in Compound 17

Compound 20
D is Br in Compound 17

Compound 22

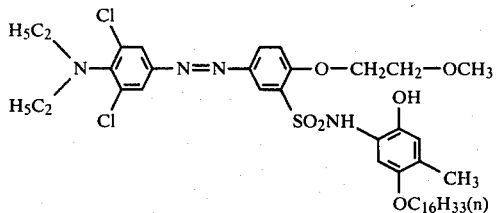

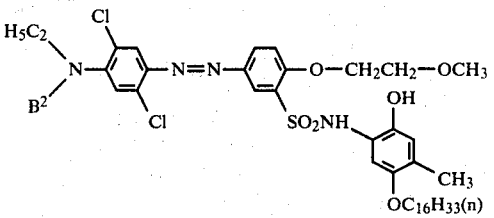

(wherein $B^2$ is $C_2H_5$)

Compound 23
$B^2$ is $C_2H_4NHSO_2CH_3$ in Compound 22

Compound 24

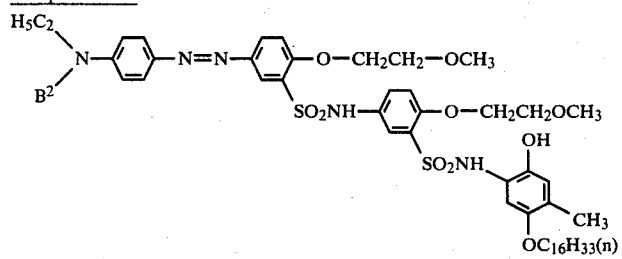

(wherein $B^2$ is $C_2H_5$)

Compound 25
$B^2$ is $C_2H_4NHSO_2CH_3$ in Compound 24

Compound 26
$B^2$ is $C_2H_4SO_2NH-\underset{\underset{CH_3}{|}}{\overset{\overset{CH_3}{|}}{C}}-CH_3$ in Compound 24

Compound 27

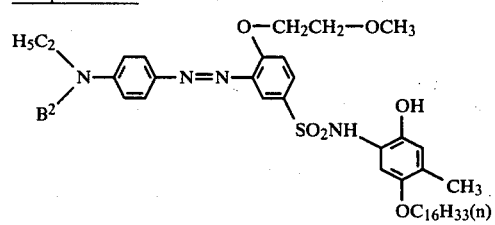

(wherein $B^2$ is $C_2H_5$)

Compound 28
$B^2$ is $C_2H_4SO_2CH_3$ in Compound 27

Compound 29

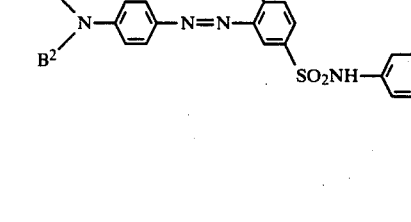

wherein $B^2$ is $C_2H_5$)

Compound 30
$B^2$ is $C_2H_4SO_2CH_3$ in Compound 29

Compound 31

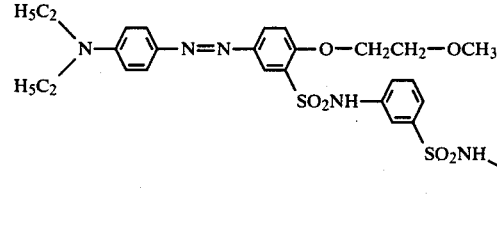

Compound 32

Compound 33

-continued
J is CO in Compound 32
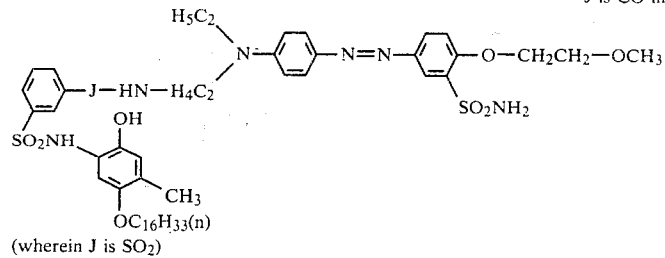
(wherein J is SO₂)
Compound 34
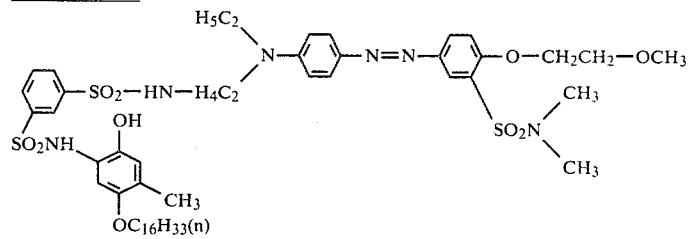
Compound 35
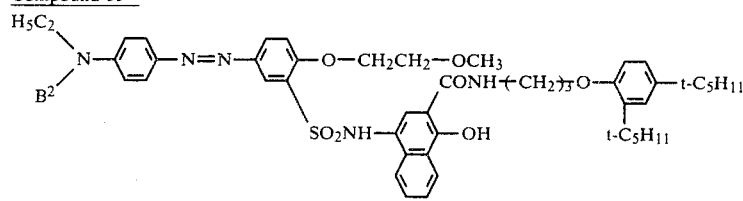
(wherein B² is C₂H₅)
Compound 36
B² is C₂H₄SO₂CH₃ in Compound 35
Compound 37
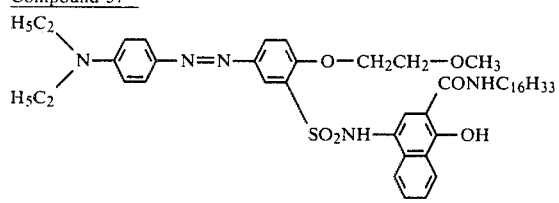
Compound 38
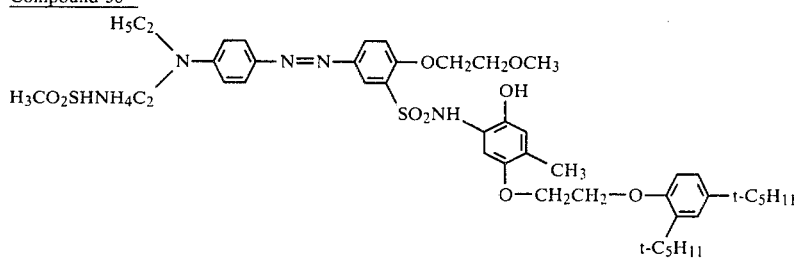
Compound 39
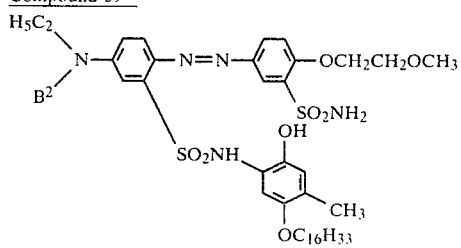
Compound 40
B² is C₂H₄Cl in Compound 39
(wherein B² is C₂H₅)
Compound 41
B² is C₂H₄NHSO₂CH₃ in Compound 39

The compound according to the present invention can release a novel yellow dye represented by the following formula (III) to (IV) when the compound is oxidized under an alkaline condition:

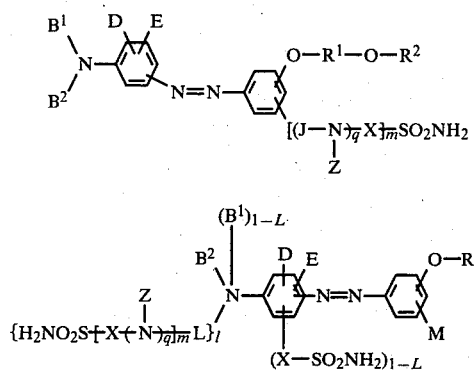

wherein $B^1$, $B^2$, D, E, $R^1$, $R^2$, Z, X, L, M, m, q and l each has the same meaning as defined in the general formula (I) or (II).

The compound according to the present invention is synthesized by condensation of a sulfonyl halide represented by the following formula (V) with an amine represented by the following formula (VI), (VII), (VIII), (IX) or (X):

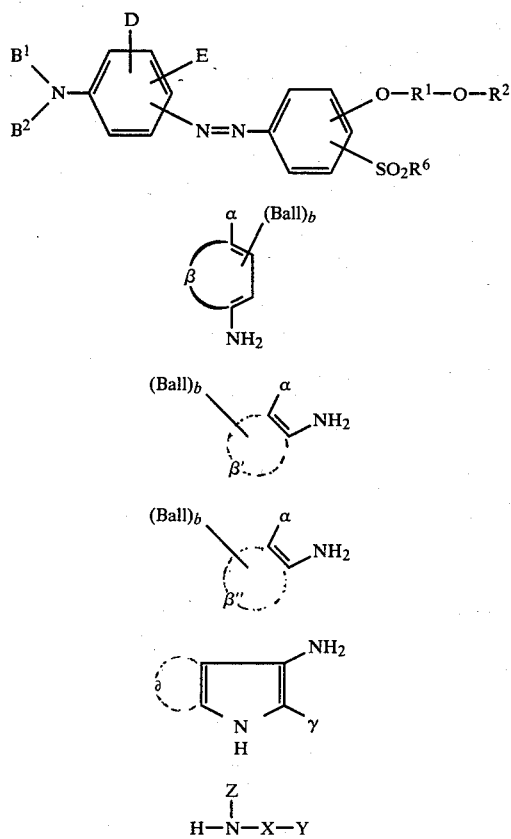

wherein $B^1$, $B^2$, D, E, $R^1$, $R^2$, Z, X and Y each has the same meaning as defined in the general formula (I); α, β, β', β'', δ, γ, and b each has the same meaning as defined in the formulae (A), (B), (C) and (D); and $R^6$ represents a halogen atom (e.g., a chlorine atom, a fluorine atom, etc.).

As another example of the method for synthesizing the compound of the present invention, mention may be made of condensation of an acid halide represented by the following formula (XI) with an amine represented by the formula (VI), (VII), (VIII) or (IX):

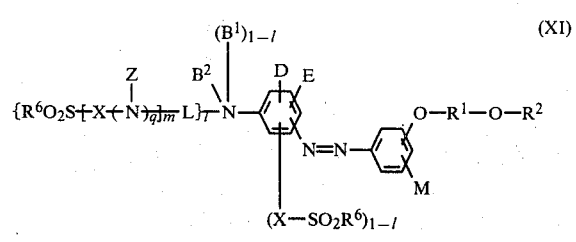

wherein $B^1$, $B^2$, D, E, $R^1$, $R^2$, M, L, Z, X, m, q and l each has the same meaning as defined in the general formula (II); α, β, β', β'', δ, γ, and b each has the same meaning as defined in the formulae (A), (B), (C) and (D); and $R^6$ has the same meaning as in the formula (V).

In general, such a condensation reaction is preferably carried out in the presence of a basic compound. Examples of the basic compound employed for the above-described purpose include a hydroxide of an alkali metal or an alkaline earth metal (e.g., sodium hydroxide, potassium hydroxide, barium hydroxide, calcium hydroxide, etc.), an aliphatic amine (e.g., triethylamine, etc.), an aromatic amine (e.g., N,N-diethylamine, etc.), a heteroaromatic amine (e.g., pyridine, quinoline, α-, β- or γ-picoline, lutidine, collidine, 4-(N,N-dimethylamino)pyridine, etc.) and a heterocyclic base (e.g., 1,5-diazabicyclo[4,3,0]nonene-5; 1,8-diazabicyclo[5,4,0]undecene-7; etc.). Of the above-described compounds, the heteroaromatic amines (especially pyridine) are particularly preferred when $R^6$ is chlorine, namely when the compound of the formula (V) or (XI) is sulfonyl chloride. In this case, it is preferred to use the base in a molar ratio of three to four times based on the sulfonyl halide of the formula (V) or the compound of the formula (XI). As a solvent for the reaction, N,N-dimethylacetoamide is most preferred. The reaction can be carried out under mild conditions such as a reaction temperature of about 0° to 40° C.

The diazo-forming component having the formula (XIV) necessary to prepare the compound of the sulfonyl halide of the formula (V) can be prepared by a process such as summarized below:

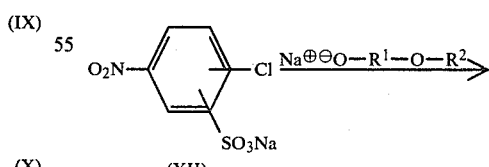
(XII)

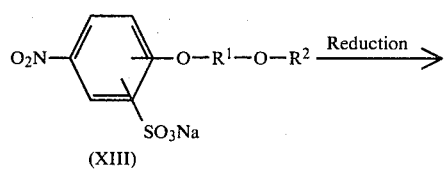
(XIII)

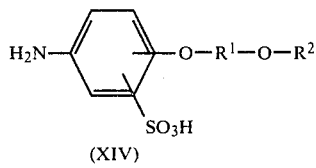

wherein $R^1$ and $R^2$ have the same meaning as in the general formula (I) or (II).

Above the first step is the reaction of a compound of the formula (XII) with $R^2$-O-$R^1$-O$^\ominus$ obtained by treating an alcohol, $R^2$-O-$R^1$-OH, with metallic sodium or sodium hydride. The reaction for obtaining a compound of the formula (XIII) is preferably carried out using an excess amount of $R^2$-O-$R^1$-OH as a solvent.

Another process for obtaining the compound of the formula (XIII) consists of reacting the compound of the formula (XII) suspended in $R^2$-O-$R^1$-OH (which is used as a solvent) with sodium hydroxide in the presence of manganese dioxide or sodium silicate (Na$_2$O.nSiO$_2$ wherein n is about 1 to about 3). This process is superior to the former process since metallic sodium or sodium hydride is not used.

Typical examples of the reduction for obtaining a compound of the formula (XIV) include a reduction with iron powder, a catalytic hydrogenation (using Raney nickel or palladium-carbon catalyst) and a reduction with hydrazine (using Raney nickel, palladium-carbon or charcoal catalyst). This reaction is well known in the art.

The diazo-forming component (XIV) is then diazotized, and coupled with a compound of the formula(XV) (namely a coupler or a coupling component) to produce an azo dye represented by the formula (XVI) in a conventional manner. Typical conditions for the diazotization as well as the iron reduction are used in the Synthesis Examples below. The compound represented by the formula (V) can be synthesized by converting the sulfonic acid group of the resulting azo dye into a sulfonyl halide using a halogenating agent as schematically illustrated below:

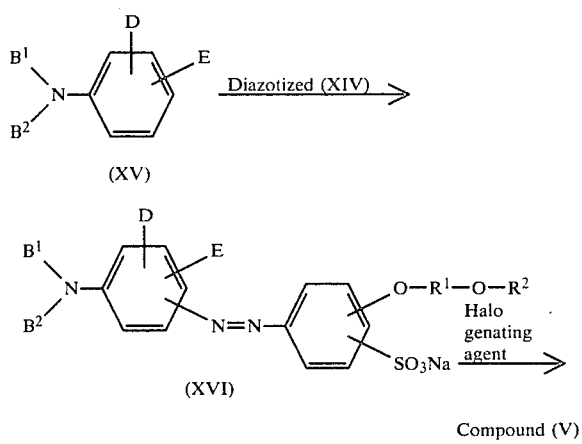

wherein $B^1$, $B^2$, D, E, $R^1$ and $R^2$ have the same meaning as defined in the general formula (I) or (II).

In order to convert the compound of the formula (XVI) into the compound of the formula (V) (wherein X is Cl), a chlorinating agent such as phosphorous oxychloride (POCl$_3$), thionyl chloride (SOCl$_2$), phosphorous pentachloride (PCl$_5$) or the like is preferably used.

The chlorination is preferably carried out in the presence of N,N-dimethylacetoamide, N,N-dimethylformamide, N-methylpyrrolidone or the like. The halogenation reaction is even more preferably carried out using phosphorus oxychloride in an amount of about 5 times (mole ratio) to the compound of the formula (XVI) in acetonitrile and refluxing 1 hour to obtain the compound of the formula (V).

Typical examples of the amines represented by the formula (VI) are described in U.S. Pat. No. 3,928,312 and Japanese Patent Application (OPI) 50,736/'78, and typical examples of the amines represented by the formula (VII) are described in U.S. Pat. Nos. 4,055,428 and 4,053,312. Further, amines described in Japanese Patent Application (OPI) 104,343/'76 are representative of the amines of the formula (VIII), and the amines described in Japanese Patent Application (OPI) 3,819/'78 are representative of the amine of the formula (IX). With minor modifications all of these amines can be condensed with the sulfonyl halide of the formula (V) to synthesize a variety of dye providing compounds.

When Z is a hydrogen atom in the formula (X), preparation of the amine represented by the formula (X) is typically carried out by following the pathway illustrated below:

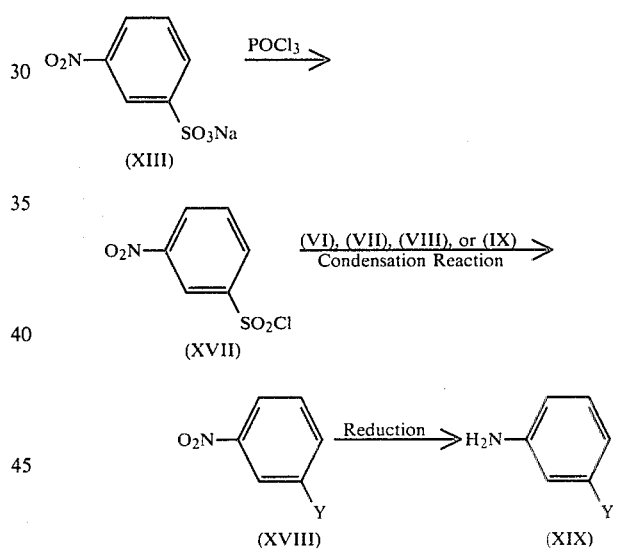

In order to convert the compound represented by the formula (XIII) to the compound represented by the formula (XVII), a chlorinating agent as described in the preparation of the compound of the formula (V) is used. Such a reaction is also preferably carried out in the presence of N,N-dimethylacetoamide, N,N-dimethylformamide, N-methylpyrrolidone or the like.

The condensation reaction of a sulfonyl chloride represented by the formula (XVII) and an o- or p-hydroxyarylamine having a ballast group of the formula (VI), (VII), (VIII) or (IX), to obtain the compound of the formula (XVIII) is preferably carried out in the presence of a basic compound as already described for condensation of the compound of formula (V) and the compound of formula (VI), (VII), (VIII), (IX) or (X). Typical examples of the reduction for obtaining the compound of the formula (XIX) include catalytic hydrogenation, reduction with iron powder, reduction with hydrazine (using Raney nickel, palladium-carbon or charcoal catalyst), etc. This reduction reaction is conducted in the same manner as that producing the compound of the formula (XIV) and is illustrated in the examples below.

In addition, another diazo-forming component (XX) is diazotized as above and then coupled with a compound represented by the formula (XXI) (which is a coupler or a coupling component) in the usual manner to produce an azo dye represented by the formula (XXII). The compound represented by the formula (XI) can be synthesized by converting the sulfonic acid group of the resulting azo dye into sulfonyl halide using a chlorinating agent as described above. The process for preparation of the compound of the formula (XI) is schematically illustrated below:

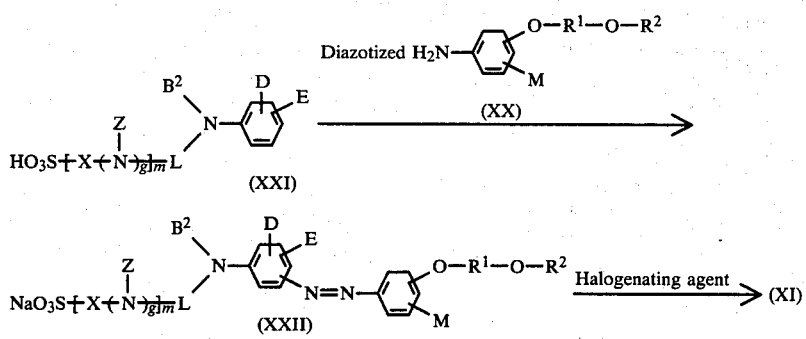

The compound of the formula (XI) may be obtained in a similar manner as the compound of the formula (V).

Typical synthesis examples of the dye releasing redox compounds used in the present invention and intermediates therefor are illustrated in detail below.

SYNTHESIS EXAMPLE 1

Synthesis of Sodium 2-(2-methoxyethoxy)-5-nitrobenzenesulfonate

[Method 1]

To a solution of sodium 2-methoxyethylate prepared by adding 7.3 g of sodium hydride (corresponding to 14.6 g in a 50% suspension in liquid paraffin) to 300 ml of methyl cellosolve, was added 55 g of sodium 2-chloro-5-nitrobenzenesulfonate with stirring. The reaction mixture was heated to a temperature of 80° to 85° C. on a water bath with stirring for 30 minutes. After filtering the mixture while it remained hot, 1.5 liters of isopropyl alcohol was added to the filtrate. The crystals thus precipitated were recovered by filtration and washed with 100 ml of isopropyl alcohol. Yield 59 g m.p. 238°–239° C.

[Method 2]

A mixture consisting of 5.2 g of sodium 2-chloro-5-nitrobenzenesulfonate, 0.6 g of manganese dioxide, 15 ml of methyl cellosolve, 1 ml of water and 0.95 g of sodium hydroxide was stirred at 75° C. for 40 minutes. After cooling, insoluble substances were removed by filtration and the filtrate was poured into 100 ml of isopropyl alcohol. The crystals thus precipitated were recovered by filtration to obtain 4.8 of sodium 2-(2-methoxyethoxy)-5-nitrobenzenesulfonate. m.p. 238°–239° C.

[Method 3]

In the same manner as in Method 2 described above except that 0.8 g of sodium silicate No. 3 ($Na_2O.nSiO_2$, wherein n is about 3) was used in place of manganese dioxide, 4.8 g of sodium 2-(2-methoxyethoxy)-5-nitrobenzenesulfonate was obtained. (The same results were obtained using $Na_2O.nSiO_2$ wherein n is about 1, about 2 and about 2.5, respectively.)

SYNTHESIS EXAMPLE 2

Synthesis of Sodium 2-(2-ethoxyethoxy)-5-nitrobenzenesulfonate

To a solution of sodium 2-ethoxyethylate prepared by adding 7.3 g of sodium hydride (corresponding to 14.6 g in a form of a 50% suspension in liquid paraffin) to 300 ml of ethyl cellosolve, was added 55 g of sodium 2-chloro-5-nitrobenzenesulfonate. The resulting mixture was heated at 80° to 85° C. for 30 minutes with stirring. After the completion of the reaction, the insoluble substances were removed by filtration, and from the filtrate 150 ml of ethyl cellosolve was distilled under reduced pressure. To the condensed solution was added 300 ml of isopropyl alcohol, and the mixture was cooled with ice. The crystals thus precipitated were recovered by filtration, washed with 100 ml of isopropyl alcohol and air-dried. Yield 33 g m.p. 248°–249° C.

Synthesis Example 3

Synthesis of Sodium 2-(2-butoxyethoxy)-5-nitrobenzenesulfonate

The above-described compound was obtained in the same manner as described in Method 2 of Synthesis Example 1 except that ethyleneglycol monobutyl ether was used in place of methyl cellosolve. m.p. 104°–106° C.

Synthesis Example 4

Synthesis of 5-Amino-2-(2-methoxyethoxy)benzenesulfonic acid

A mixed solution consisting of 30 g of 2-(2-methoxyethoxy)-5-nitrobenzenesulfonic acid, 30 g of reducing iron, 0.6 g of ammonium chloride and 60 ml of water was kept at a temperature of 80° to 85° C. over a period of 2 hours with stirring. After the completion of the reaction, the insoluble substances were removed by filtration. To the filtrate was added 200 ml of isopropyl alcohol and the mixture was cooled with ice. The crystals thus precipitated were recovered, washed with 50 ml of isopropyl alcohol and air-dried. Yield 23 g m.p. 250° C. or above.

Synthesis Example 5

Synthesis of Compound 1

(1) Synthesis of
N,N-diethyl-4-[4-(2-methoxyethoxy)-3-sulfophenylazo]-aniline

To a solution consisting of 4.0 g of sodium hydroxide and 80 ml of water, was added 13.3 g of 5-amino-2-(2-methoxyethoxy)benzenesulfonic acid and subsequently 3.8 g of sodium nitrite was added to result in complete dissolution of the additives in the solution. The resulting solution was added dropwise to 100 ml of 2 N hydrochloric acid while the reaction mixture was maintained at a temperature of 5° C. or below. After completion of the addition, the mixture was allowed to stand with stirring for 30 minutes to force the reaction to completion. The solution thus obtained is referred to as the diazo solution.

Separately, to a mixed solution consisting of 13 g of sodium acetate, 100 ml of water and 50 ml of methanol, was added 7.0 g of N,N-diethylaniline. The diazo solution prepared above was added dropwise to the mixture while the reaction mixture was maintained at a temperature of 10° C. or lower. After completion of the addition, the mixture was allowed to stand with stirring for 30 minutes while it was maintained at a temperature of 10° C. or lower and further, stirring was continued over a period of 1 hour at a room temperature. The crystals thus precipitated were recovered by filtration, washed with 20 ml of aceton and air-dried. Yield 19.0 g Melting Point 200° C. or above.

(2) Synthesis of
N,N-diethyl-4-[4-(2-methoxyethoxy)-3-chlorosulfonylphenylazo]-aniline 10 ml of N,N-dimethylacetoamide was added dropwise to a mixture of 13 g of N,N-diethyl-4-[4-(2-methoxyethoxy)-3-sulfophenylazo]-aniline prepared in Step (1) described above, 100 ml of acetonitrile and 13 ml of phosphorus oxychloride while the reaction mixture was maintained at a temperature of 30° C. or lower. After completion of the addition, the mixture was allowed to stand with stirring over a period of 3 hours and then, it was poured little by little into 500 ml of ice water. The crystals thus precipitated were recovered by filtration, washed with 200 ml of water and air-dried. Yield 11.0 g, Melting Point 103°–104° C.

(3) Synthesis of Compound 1

To 40 ml of N,N-dimethylacetoamide, were added 8.0 g of 2-amino-4-hexadecyloxy-5-methyl-phenyl hydrochloride, 2.8 ml of triethylamine and 3.0 ml of pyridine. 8.5 g of N,N-diethyl-4-[4-(2-methoxyethoxy)-3-chlorosulfonylphenylazo]aniline prepared in Step (2) described above was added to the above-described mixture with stirring. After completion of the addition, the resulting mixture was allowed to stand with stirring at a room temperature over a period of 2 hours. Then 120 ml of methanol and 40 ml of water were added to the reaction mixture. The thus precipitated crystals were recovered by filtration and further, recrystallized from a mixed solvent consisting of 50 ml of N,N-dimethylacetoamide and 100 ml of methanol. Yield 12.0 g Melting Point 158°–160° C.

While the above examples are directed to the synthesis of dye releasing redox compounds, it will be apparent to those skilled in the art that the other dye providing compounds discussed above can be synthesized by analogous procedures.

In the reproduction of natural color by substractive color photography, a color photographic element comprising at least two combination of a silver halide emulsion having selective spectral sensitivity in a certain wavelength region and a compound capable of providing a dye having a selective spectral absorption at the same wavelength region as the aforementioned emulsion, is used. In particular, a color photographic element comprising a combination of a blue sensitive silver halide emulsion and a compound capable of providing a yellow dye, a combination of a green sensitive silver halide emulsion and a compound capable of providing a magenta dye, and a combination of a red sensitive silver halide emulsion and a compound capable of providing a cyan dye is useful. As a matter of course, the dye providing compounds of the present invention can be used as the compounds capable of providing the above-described dyes. Each of these combinations (or units) of emulsion and dye providing compounds may be coated on a support in a double layer construction of a silver halide emulsion layer and a dye providing compound-containing layer, which are superposed in face-to-face relationship; or they may be coated on a support in a form of mono-layer in which silver halide and a dye providing compound are incorporated in a binder in a mixture of their respective grains. The dye-providing compound of the present invention is used in a molar ratio of about 0.5 to 50, preferably about 2 to 20 based on the silver in the silver halide emulsion associated with the dye-providing compound.

In a preferred multilayer structure, a blue sensitive emulsion layer, a green sensitive emulsion layer and a red sensitive emulsion layer are positioned in this order from the exposure side of a support and in particular, it is desirable that a yellow filter layer is positioned between the blue sensitive emulsion layer and the green sensitive emulsion layer if a highly sensitive silver halide emulsion containing silver iodide is used. The yellow filter layer contains usually a dispersion of yellow colloidal silver, a dispersion of an oil-soluble yellow dye, an acid dye mordanted onto a basic polymer or a basic dye mordanted onto an acid polymer.

It is advantageous for the emulsion layers to be separated from each other by an interlayer. The interlayer acts to prevent the occurrence of undesirable interactions between the emulsion layers which differ from each other in color sensitivity. The interlayer is usually composed of a hydrophilic polymer such as gelatin, polyacrylamide, a partially hydrolyzed product of polyvinyl acetate, etc.; a polymer containing fine pores formed from a latex of a hydrophilic polymer and a hydrophobic polymer as described in U.S. Pat. No. 3,625,685; or a polymer whose hydrophilic property is gradually increased by a liquid processing composition, such as calcium alginate, as described in U.S. Pat. No. 3,384,483, individually or in combination thereof.

The silver halide emulsion which can be used in the present invention is a hydrophilic colloidal dispersion of silver chloride, silver bromide, silver chlorobromide, silver iodobromide, silver chloroiodobromide or a mixture thereof, and the halogen composition is selected depending upon the purpose of end-use of a sensitive material and the processing conditions for a sensitive material. However, a silver iodobromide or a silver chloroiodobromide emulsion having an iodide content of 1 to 10 mole %, (having a chloride content of 30 mole % or less) and the balance bromide is particularly preferred. The grain size of the silver halide used may be a conventional grain size or a fine grain size, but silver halide grains having a mean size of about 0.1 micron to about 2 microns are preferred. Further, depending upon the purpose or the end-use of the sensitive material, it is desirable to use silver halide having a uniform grain size. Silver halide grains used in the present invention may have a crystal form of a cubic system, an octahedral system or the mixed system thereof. These silver halide emulsions may be prepared using conventional method as described in, for example, P. Glafkides, *Chimie Photographique*, Chapters 18–23, 2nd Edition, Paul Montel, Paris (1957).

The silver halide emulsions used in the present invention are preferably subjected to chemical sensitization by a combination of heat and the use of such a chemical sensitizers as the natural sensitizer contained in gelatin, a sulfur sensitizer (e.g. sodium thiosulfate and N,N,N'-triethylthiourea), a gold sensitizer (e.g., a thiosulfate complex salt of monovalent gold and a thiocyanate complex salt of monovalent gold), or a reducing sensitizer (e.g., stannous chloride and hexamethylenetetramine). Moreover, emulsions which form a latent image on the surface of the silver halide grains, emulsions which form latent image inside the silver halide grains as described in U.S. Pat. Nos. 2,592,550; 3,206,313; etc., and direct positive emulsions can also be used in the present invention.

The silver halide emulsions used in the present invention may be stabilized by additives such as 4-hydroxy-6-methyl-1,3,3a,7-tetrazaindene, 5-nitroimidazole, 1-phenyl-5-mercaptotetrazole, 8-chloromercuryquinoline, benzenesulfinic acid, pyrocatechin, 4-methyl-3-sulfoethylthiazolidine-2-thion, 4-phenyl-3-sulfoethylthiazolidine-2-thion and so on. In addition, inorganic compounds such as cadmium salts and mercury salts, and complex salts of platinum group metals such as the chloro complex salt of palladium and the like are also useful for stabilizing the sensitive materials of the present invention. Furthermore, the silver halide emulsions used in the present invention may contain sensitizing compounds such as a polyethylene oxide compound. The silver halide emulsions used in the present invention can possess, if desired, color sensitivities expanded with spectral sensitizing dyes. Examples of useful spectral sensitizers include cyanines, merocyanines, holopolarcyanines, styryls, hemicyanines, oxanoles, hemioxanoles and so on.

Specific examples of spectral sensitizers which are suitably used in the present invention are described in, for example, P. Glafkides, *Chimie Photographique, supra*, Chapters 35–41, and F. M. Hamer, *The Cyanine and Related Compounds*, published by Interscience. Spectral sensitizers particularly useful for the practice of the present invention are cyanines which are substituted by aliphatic groups (e.g., alkyl groups) having hydroxy groups, carboxy groups or sulfo groups at the positions of nitrogen atoms of the basic heterocyclic nuclei, as described in U.S. Pat. Nos. 2,503,776; 3,459,553 and 3,177,210.

The dye providing compound used in the present invention can be dispersed into a hydrophilic colloid acting as a carrier using various techniques according to the type of the compound. For example, when the dye providing compound has a dissociable group such as a sulfo group or a carboxy group, the compound is first dissolved in water or an aqueous alkaline solution and then, added to an aqueous solution of a hydrophilic colloid. On the other hand, when the dye providing compound is sparingly soluble in an aqueous medium but is readily soluble in an organic solvent, the dye providing compound is first dissolved in an organic solvent and then, the solution is finely dispersed into an aqueous solution of a hydrophilic colloid by means of agitator or the like. Applicable dispersing techniques are described in detail in, for example, U.S. Pat. Nos. 2,322,027; 2,801,171; 2,949,360 and 3,396,027.

It is advantageous for stabilizing the dispersion of the dye providing compound and further, for promoting the formation of dye image to incorporate the dye providing compound in a solution prepared by dissolving it in a high boiling point solvent which is substantially insoluble in water and has a boiling point of about 200° C. or above at normal pressure. Specific examples of high boiling point solvents suitable for this purpose include aliphatic esters such as the triglycerides of higher fatty acids, di-octyl-adipate, etc.; phthalic acid esters such as di-n-butylphthalate, etc.; phosphoric acid esters such as tri-o-cresyl phosphate, tri-n-hexyl phosphate, etc.; amides such as N,N-diethyllaurylamide, etc.; hydroxy compounds such as 2,4-di-n-amylphenol, etc.; and so on.

Furthermore, it is also advantageous for promoting the dye image formation through the stabilization of the dispersion of the dye providing compound to incorporate an oleophilic polymer into the photosensitive sheet together with the dye providing compound. Examples of suitable oleophilic polymers which can be used for this purpose are shellac, a phenol-formaldehyde condensate, poly-n-butyl acrylate, a copolymer of n-butyl acrylate and acrylic acid, a copolymer of n-butyl acrylate, styrene and methacrylamide, and so on. Such an oleophilic polymer may be dissolved in an organic solvent together with the dye providing compound and then, may be dispersed into a photographic hydrophilic colloid such as gelatin or the like; or may be added to a hydrophilic colloidal dispersion of the dye providing compound in a form of a hydrosol of the above-described polymer prepared by means of emulsion polymerization or the like. In general, the dispersion of the dye providing compound can be achieved with high efficiency under great shearing stress. For example, a high-speed rotary mixer, a colloid mill, a high pressure milk homogenizer, a special high pressure homogenizer disclosed in British Patent 1,304,264; an emulsifying apparatus utilizing ultrasonic wave; and so on are useful.

Moreover, the dispersion of the dye providing compound can be greatly promoted by the use of a surface active agents as an emulsification aid. Examples of surface active agents useful for the dispersion of the dye providing compound used in the present invention are sodium triisopropylnaphthalenesulfonate, sodium dinonylnaphthalenesulfonate, sodium p-dodecylbenzenesulfonate, sodium dioctylsulfosuccinate, sodium cetylsulfate, and anionic surface active agents as described in Japanese Patent Publication 4,293/'64 and British Patent 1,138,514. The combined use of one of these anionic surface active agents and the higher fatty acid ester of anhydrohexitol exhibits particularly excellent emulsifying capability, as disclosed in U.S. Pat. No. 3,676,141. Furthermore, the dispersion methods disclosed in Japanese Patent Publication 13,387/'68 and U.S. Pat. Nos. 2,992,104; 3,044,873; 3,061,428 and 3,832,173 are effectively employed for dispersing the dye providing compounds of the present invention.

The processing solution permeable layers used in the present invention, such as silver halide emulsion layers, dye providing compound-containing layers and auxiliary layers (e.g., a protective layer and an interlayer) contain a hydrophilic polymer as a binder. The use of gelatin as a hydrophilic polymer is advantageous, but hydrophilic polymers other than gelatin can be also employed.

Suitable hydrophilic polymers include proteins such as gelatin derivatives, polymer grafted gelatins, albumin, casein, etc.; cellulose derivatives such as hydroxyethyl cellulose, carboxymethyl cellulose, cellulose sulfate, etc.; sugar derivatives such as sodium alginate, starch derivatives, etc.; and various kinds of synthetic hydrophilic high polymers such as polyvinyl alcohol, partially hydrolyzed products of polyvinyl acetate, poly-N-vinyl pyrrolidone, polyacrylic acid, polymethacrylic acid, polyacrylamide, polyvinyl imidazole, polyvinyl pyrazole, etc. These hydrophilic polymers can be used individually or in combination.

Not only lime processed gelatin but also acid processed gelatin and further, enzyme processed gelatin as described in *Bull. Soc. Sci. Phot. Japane*, No. 16, 30 pp (1966) can be employed as the aforementioned gelatin. In addition, hydrolyzed products of gelatin and enzymatically decomposed products of gelatin may be also employed. As the gelatin derivatives, products obtained by reacting gelatin with various kinds of compounds such as acid halides, acid anhydrides, isocyanates, bromoacetic acid, alkane sultones, vinyl sulfonamides, maleinimide compounds, polyalkylene oxides, epoxy compounds, etc., can be employed. Specific examples of these gelatin derivatives are described in U.S. Pat. Nos. 2,614,928; 3,132,945; 3,186,846 and 3,312,553: British Patents 861,414; 1,033,189 and 1,005,784; Japanese Patent Publication 26,845/'67: and so on.

As the above-described polymer grafted gelatins, those which are obtained by grafting on gelatin homo- or co-polymers of vinyl monomers such as acrylic acid, methacrylic acid, the esters thereof, the amides thereof, acrylonitrile, styrene and the like can be used. In particular, gelatins on which polymers compatible with the gelatins to certain extent, such as polymers of acrylic acid, methacrylic acid, acrylamide, methacrylamide, hydroxyalkylmethacrylate and like monomers, are grafted are preferred. Examples of such grafted gelatins are described in U.S. Pat. Nos. 2,763,625; 2,831,767; 2,956,884 and so on.

Typical examples of synthetic hydrophilic macromolecular substances include those which are described in German Patent Application (OLS) 2,312,708; U.S. Pat. Nos. 3,620,751 and 3,879,205; and Japanese Patent Publication 7,561/'68.

The silver halide emulsion layers, the dye providing compound-containing layers or other hydrophilic colloidal layers, which can be employed for preparing a photographic light sensitive sheet of the present invention, can contain coating aids and inorganic or organic hardeners.

Examples of useful coating aids are described in *Product Licensing Index (PLI)*, volume 92, number 9232, page 108, the clause XII Coating Aids (December, 1971).

Examples of useful hardeners are described in *PLI*, volume 92, number 9232, page 108, the clause VII Hardeners.

The light-sensitive sheet of the present invention is prepared by coating directly or indirectly at least one light sensitive silver halide photographic emulsion layer associated with the dye releasing redox compound according to the present invention on a substantially planar material which does not undergo remarkable dimensional change in the course of processings. Examples of suitable supports are cellulose acetate films, polystyrene films, polyethylene terephthalate films, polycarbonate films and so on, which are used as supports for conventional photographic light sensitive materials. Other examples of effective supports are papers and papers coated with water impermeable polymers such as polyethylene and the like.

As examples of a method for producing diffusion transfer color photographic images by using dye providing compounds, the methods described in Japanese Patent Application (OPI) 114,424/'74 and 33,826/'73, and Belgian Patent 788,268 are employed. These image forming methods can be effectively employed in combination with the dye providing compounds according to the present invention.

One embodiment for obtaining color diffusion transfer images using the dye providing compound according to the present invention, especially the dye releasing redox compound, includes a series of steps as described below:

(A) a light sensitive sheet comprising a support having at least one light sensitive silver halide emulsion layer associated with the dye releasing redox compound according to the present invention (hereinafter refer to as a light sensitive element) is image-wise exposed to light.

(B) an alkaline processing composition is spreaded onto the above-described light sensitive silver halide emulsion layers and thereby, development of all light sensitive silver halide emulsion layers is conducted in the presence of the developing agent for silver halides.

(C) as a result, an oxidation product of the developing agent, which is produced in proportion to the exposure amount, cross-oxidizes the dye releasing redox compound.

(D) the resulting oxidation product of the dye releasing redox compound is split to release a diffusible dye.

(E) the released dye diffuses with image-wise distribution to form transferred image on an image-receiving layer (which is directly or indirectly adjacent to the light sensitive layer).

In the above-described process, any silver halide developing agent may be employed provided that they can cross-oxidize the dye providing compounds, especially the dye releasing redox compounds. These developing agents may be incorporated in an alkaline processing composition or may be incorporated in appropriate photographic layers of a light sensitive element. Specific examples of developing agents which can be used in the present invention include hydroquinones; aminophenols (e.g., N-methylaminophenol); pyrazolidones (e.g., phenidone, 1-phenyl-3-pyrazolidone, dimezone (i.e., 1-phenyl-4,4-dimethyl-3-pyrazolidone), 1-phenyl-4-methyl-4-oxymethyl-3-pyrazolidone, etc.); phenylenediamines (e.g., N,N-diethyl-p-phenylenediamine, 3-methyl-N,N-diethyl-p-phenylenediamine, 3-methoxy-N-ethoxy-p-phenylenediamine, etc.); and so on.

Of the developing agents set forth above, black and white developing agents which generally reduce the occurrence of stains in image-receiving layers are particularly preferred in comparison with color developing agents such as phenylenediamines.

In case that the dye providing compounds according to the present invention, especially the dye releasing redox compounds of the present invention, are employed, the transferred image formed in the image receiving layer is a negative image and the image remaining in the light sensitive layer is a positive image when a conventional surface latent image forming type emulsion is used and a reversal mechanism is not applied thereto. On the other hand, when a direct positive silver halide emulsion (including an emulsion which can provide direct reversal positive images by subjecting the emulsion to a fogging treatment during development after exposure such as an internal latent image forming type silver halide emulsion or a solarization type silver halide emulsion) is employed as the silver halide emulsion the transferred image formed in the image receiving layer is a positive image. Solarization type silver halide emulsions described in C. E. K. Mees, *The Theory of the Photographic Process*, pages 261–297, MacMillan Co., New York (1942) are useful. Preparation methods for these solarization type silver halide emulsions are described in, for example, British Patents 443,245 and 462,730; U.S. Pat. Nos. 2,005,837; 2,541,472; 3,367,778; 3,501,305; 3,501,306 and 3,501,307; etc. Internal latent image forming type silver halide emulsions which can be advantageously used in the present invention are described in, for example, U.S. Pat. No. 2,592,250, etc. Typical examples of fogging agents employed for the emulsions of the above-described type include hydrazines described in U.S. Pat. Nos. 2,588,982 and 2,563,785; hydrazide and hydrazone described in U.S. Pat. No. 3,227,552; and quaternary salt compounds described in British Patent 1,283,835: Japanese Patent Publication 38,164/'74: and U.S. Pat. Nos. 3,734,738; 3,719,494 and 3,615,615.

Furthermore, the diffusion inhibitor releasing (DIR) reversal silver halide emulsion system as described in U.S. Pat. Nos. 3,227,551; 3,227,554 and 3,364,022 or the reversal silver halide emulsion system by means of dissolution physical development as described in British Patent 904,364 can be also employed in combination with the dye providing compounds, especially the dye releasing redox compounds, according to the present invention.

It is indispensable for the image receiving element used in combination with the above-described light sensitive element to have a mordanting layer containing a mordant such as a poly-4-vinylpyridine latex (in, in particular, polyvinyl alcohol) as described in U.S. Pat. No. 3,148,061; polyvinyl pyrrolidone as described in U.S. Pat. No. 3,003,872; polymers containing quaternary ammonium salts as described in U.S. Pat. No. 3,239,337; etc. individually or in combination thereof. In addition, basic polymers as described in U.S. Pat. Nos. 2,882,156; 3,625,694; 3,709,690; etc. are also effectively used as the mordant for the image receiving layer. Other examples of mordants which can be effectively used in the present invention are described in U.S. Pat. Nos. 2,484,430; 3,271,147; 3,184,309; 3,271,147, etc.

It is desirable for the light sensitive sheet of the present invention to have a system for neutralizing an alkali carried in by an alkaline processing composition. It is advantageous for this purpose to incorporate in the light sensitive sheet (for example, in a cover sheet or an image receiving element) a neutralizing layer containing an acid material in an amount sufficient to neutralize the alkali contained in a liquid processing composition in an concentration area by higher than equivalent to the alkali in the spread liquid processing composition. When a cover sheet having a neutralizing layer is used, it is effective to apply the cover sheet to a peelable image receiving element. Typical examples of preferred acid materials are described in U.S. Pat. Nos. 2,983,606; 2,584,030; 3,362,819; etc. The neutralizing layer may additionally contain a polymer such as cellulose nitrate, polyvinyl acetate, etc., and a plasticizer as described in U.S. Pat. No. 3,557,237. The acid material can be incorporated in the light sensitive sheet in a micro-encapsulated form as described in German Patent Application (OLS) 2,038,254.

It is desirable for the neutralizing layer or the acid material-containing layer which can be used in the present invention to be isolated from the spread layer of the liquid processing composition by a neutralization rate controlling layer (referred to as a timing layer). As the timing layer, gelatin, polyvinyl alcohol or the compounds described in U.S. Pat. Nos. 3,455,686, 4,009,030; 4,123,275 and 3,785,815: U.K. Patent 1,514,367, Japanese Patent Applications (OPI) 92,022/'73, 64,435/'74, 22,935/'74 and 77,333/'76: Japanese Patent Publications 15,756/'69, 12,676/'71 and 41,214/'73: German Patent Applications (OLS) 1,622,936 and 2,162,277: *Research Disclosure*, volume 151, number 15,162 (1976): and so on can be effectively employed. The timing layer has such a function that it retards the reduction in pH of the liquid processing composition caused by the neutralizing layer and, thereby, desired development and transfer can be effected with satisfactory speed.

In a preferred embodiment of the present invention, the image receiving element has a multilayer structure comprising of a support, a neutralizing layer, a timing layer and a mordanting layer (image receiving layer) in this order. The image receiving elements are described in detail, for example, Japanese Patent Application (OPI) 13,285/'72; U.S. Pat. No. 3,295,970; British Patent 1,187,502; etc.

The processing composition constituting the processing element employable in the present invention is a liquid composition containing processing components necessary for developing silver halide emulsions and forming diffusion transfer dye images. The main component of the solvent, which solvent is one of the processing components, is water and, as the case may be, the solvent may contain a hydrophilic solvent such as methanol, methyl cellosolve, etc. The processing composition contains an alkali in an amount sufficient to maintain the pH necessary to cause development in the emulsion layers and to neutralize the acids (e.g., a hydrohalic acid such as hydrobromic acid, etc., and a carboxylic acid such as acetic acid, etc.) produced during the development and the dye image forming treatments. Examples of suitable alkalis are hydroxides or salts of ammonium, alkali metals and alkaline earth metals, or amines, and more specifically lithium hydroxide, sodium hydroxide, potassium hydroxide, an aqueous dispersion of calcium hydroxide, tetramethylammonium hydroxide, sodium carbonate, trisodium phosphate, diethylamine, etc. It is desirable for the processing composition to contain an alkaline material in such a concentration that the pH thereof can be maintained at about 12 or above, in particular 14 or above, at room temperature.

More preferably, the processing composition contains a hydrophilic polymer such as high molecular weight polyvinyl alcohol, hydroxyethyl cellulose, sodium carboxymethylcellulose, etc. These polymers are added in such amounts so as to impart a viscosity of 1 poise or more, preferably 500 to 600 to 1,000 poise, at room temperature to the liquid processing composition. The addition of the polymers in such amounts facilitates not only the uniform spreading of the processing composition at the time of development but also the formation of a non-fluid film when the aqueous medium diffuses into the light sensitive element and the image receiving element in the course of the processing and thereby, the processing composition is concentrated, which results in assisting the unification of all elements after processing. Moreover, the polymer film thus formed contributes to the prevention of the transfer of coloring components into the image receiving layer and consequently, to the prevention of change in image quality after the formation of the diffusion transfer dye images is substantially completed.

As the case may be, it is advantageous for the liquid processing composition to further contain a light absorbing substance such as $TiO_2$, carbon black, a pH indicating dye, etc.; and a desensitizer as described in U.S. Pat. No. 3,579,333 in order to prevent the silver halide emulsions from being fogged by externally applied light during processing. Furthermore, the liquid processing composition may contain a development inhibitor such as benzotriazole.

It is desirable for the above-described processing composition to be retained in a rupturable container as described in U.S. Pat. Nos. 2,543,181; 2,643,886; 2,653,732; 2,723,051; 3,056,491; 3,056,492; 3,152,515 and so on.

The light sensitive sheet of the present invention can be employed in a form of a photographic film unit, that is, the film unit having such a construction that after imagewise exposure, the photographic processing can be performed by passing it through a pair of juxtaposed pressure-applying means, which film unit is composed of the following elements:

(1) a support,
(2) a light sensitive element,
(3) an image receiving element,
(4) a processing element, and
(5) a developing agent (which can be incorporated into the processing element or the light sensitive element).

In one embodiment of the above-described film unit, the light sensitive element and the image receiving element are superposed upon each other in a face-to-face relationship, and the processing is performed by spreading the alkaline processing composition between these elements after exposure. Therein, the image receiving element may be peeled off after the conclusion of the transfer of images, or the film unit may be constituted so that images transferred can be observed without peeling the image receiving element off the light sensitive element.

In another embodiment of this invention, the image receiving element and the light sensitive element are positioned in this order in a unit on a support. For instance, an effective unit is prepared by coating on a transparent support an image receiving layer, a substantially opaque light reflecting layer (e.g., a $TiO_2$—or carbon black-containing layer) and a single or plural light sensitive layers as described above, in this order, as disclosed in Belgian Patent 757,960. After exposing the light sensitive element to light, it is superposed in face-to-face relationship upon a process sheet having opacity enough to shade light and then, a liquid processing composition is spread between them.

The embodiment of the film unit of superposed and unified type which is most preferably applicable to the present invention is disclosed in Belgian Patent 757,959. According to such an embodiment, the film unit is prepared by coating on a transparent support an image receiving layer, a substantially opaque light reflecting layer (as described above) and a single or plural light sensitive layers as described above, in this order, and further by superposing a transparent cover sheet upon the top layer of the light sensitive layers in a face-to-face relationship. A rupturable container retaining therein an alkaline processing composition containing a light intercepting agent such as, for example, carbon black, is disposed adjacent to and between the topmost layer of the above-described light sensitive element and the transparent cover sheet. Such a film unit as described above is exposed to light with an imagewise distribution in a camera through the transparent cover sheet and then, the rupturable container retaining the processing composition (containing the opacifying agent) is ruptured by pressure applying means when the film unit is withdrawn from the camera to result in the uniform spreading of the processing composition between the topmost light sensitive layer and the cover sheet and thereby, the light sensitive element is sandwiched by opaque light-intercepting layers and consequently, the development proceeds in a bright room.

It is recommended to incorporate a neutralization mechanism as described above into the film units according to the above-described embodiments.

In particular, it is preferable to provide the neutralizing layer in the cover sheet (and optionally, to provide additionally the timing layer on the side where the processing solution is spread).

Moreover, other useful embodiments of the superposed and unified type of film units wherein the dye providing compounds, especially the dye releasing redox compounds, of the present invention can be used are described in U.S. Pat. Nos. 3,415,644; 3,415,645; 3,415,646; 3,647,487 and 3,635,707: and German Patent Application (OLS) 2,426,980.

The present invention can provide the following effects and advantages:

Firstly, color images attended with much reduced light-fading phenomenon are obtained because of the superiority in the light-fastness of the dyes released.

Secondly, color images having high qualities are obtained when the dye releasing redox compound according to the present invention is used together with other dye providing compounds having good hue, since hue of the dye released is excellent (which is unchanged over a wide pH range).

Thirdly, an amount of dyes remaining at exposed areas in the light sensitive element is very small since the transferability of the dyes released is excellent.

Therefore, it is effective to obtain negative color images composed of the dye releasing redox compounds remaining unreacted in the light sensitive element, provided that the light sensitive element is peeled off, if necessary, and subjected to a desilvering processing, for the dye releasing compounds according to the present invention. (Namely, the dye releasing compounds according to the present invention is effectively applied to negative utilizable light sensitive sheets).

The following experiments and example are given to further illustrate the present invention in greater detail.

Experiment 1

The dye compound A released from Compound 1, which has the following structural formula:

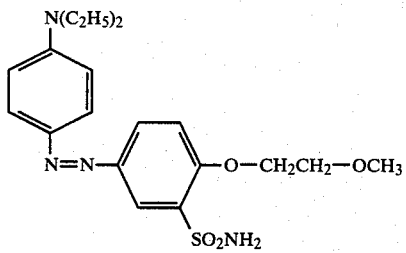

was dissolved in an amount of 20 mg in 5.0 ml of a 1/10 N sodium hydroxide aqueous solution. On a transparent support of polyethylene terephthalate film, was coated a mordanting layer containing the mordant having the following formula at the coverage of 3.0 g of mordant per square meter;

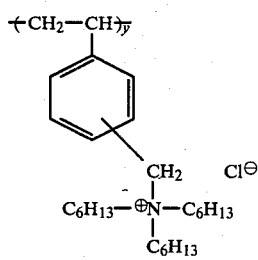

It was cut in strips to prepare mordanting strips. The mordanting strips were dipped in the solution of the above-described dye compound for such a period that the dyed strips may have the absorbance ranging from about 0.5 to 1.0 at the wavelength where the absorption of the dye compound has the maximum value. The thus dyed strips each was soaked in buffer solution adjusted to different pH, and the absorption spectrum thereof in the visible region was measured as the strip was soaked therein. (The result is shown in FIG. 1).

Figure 2:
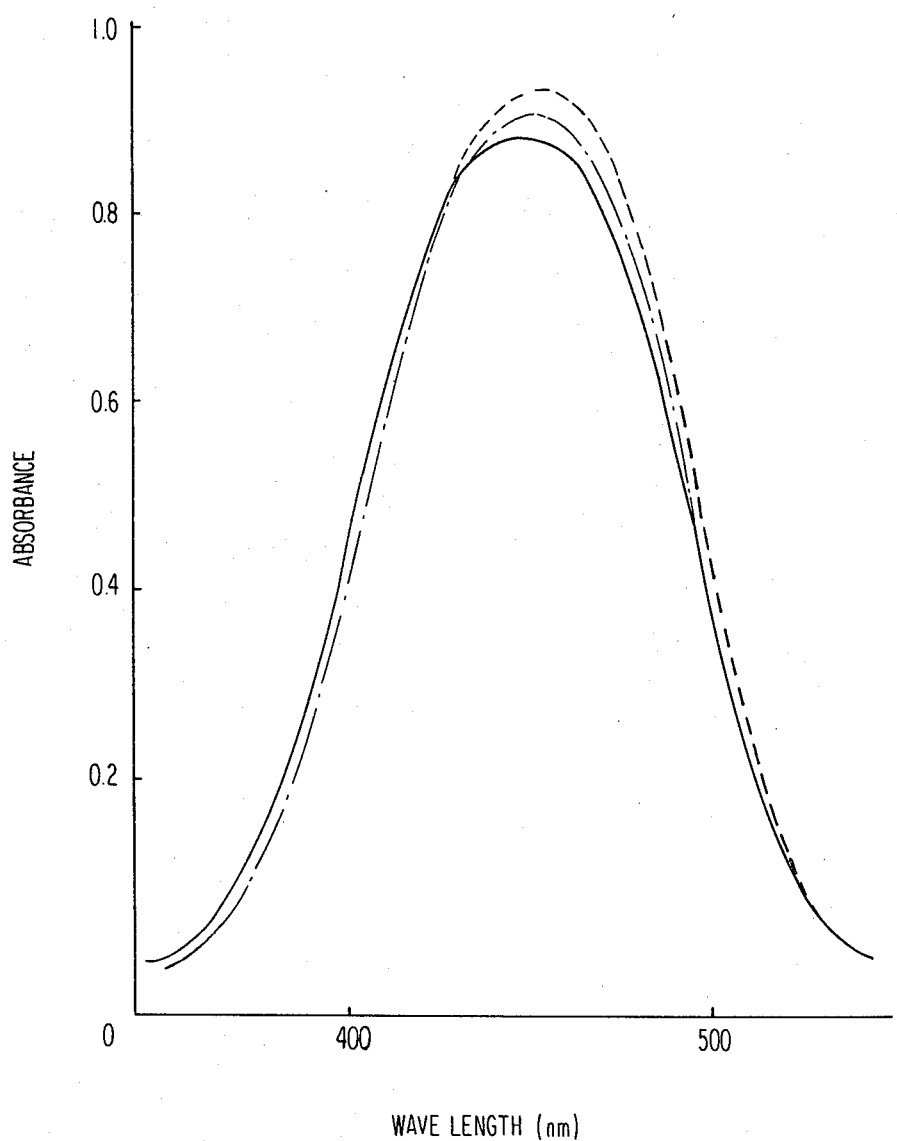
Figure 3:
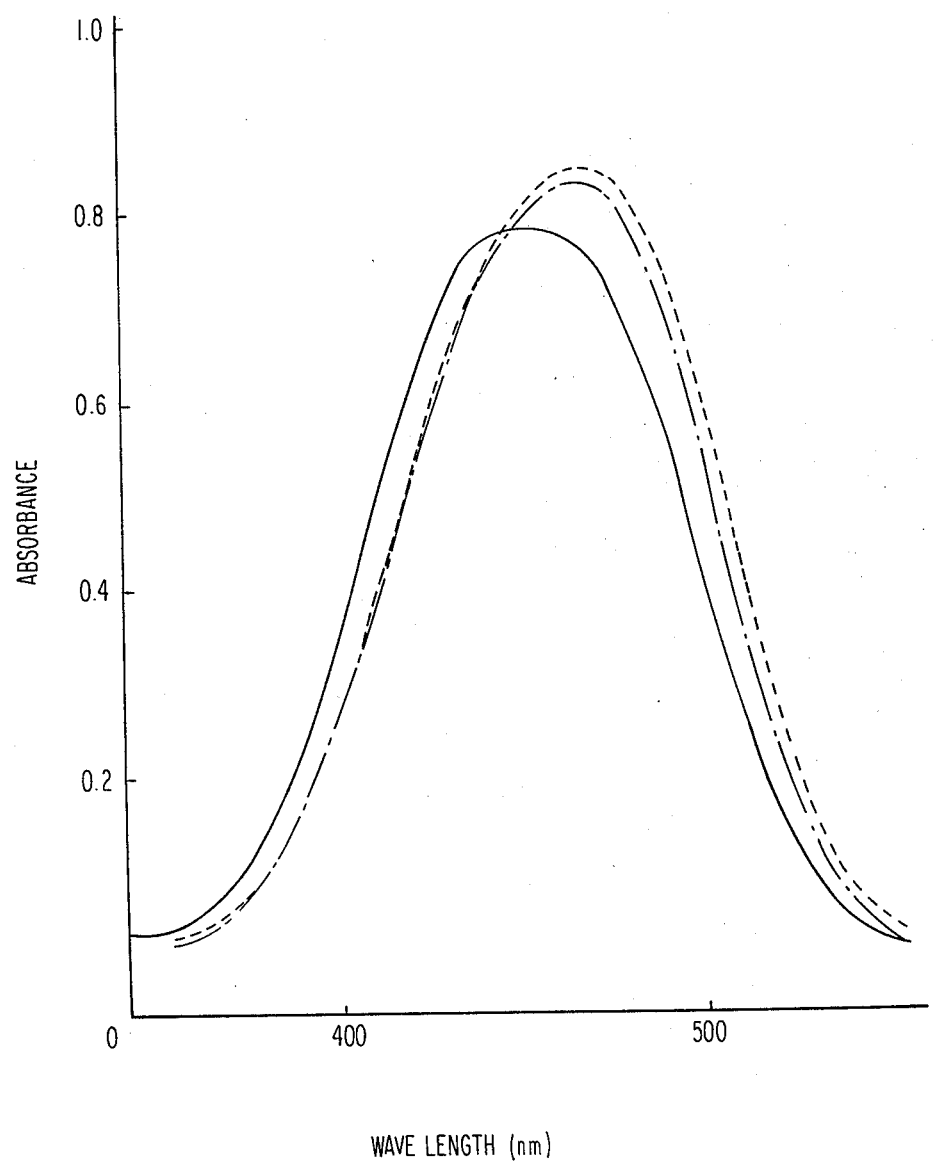

For the purpose of comparison, absorption spectra in the visible region at different pH values were measured with respect to the compounds B and C, which were employed for comparison with the compound A, according to the same procedure as described above. The results of the compounds B and C are shown in FIGS. 2 and 3, respectively.

Compound B for Comparison:

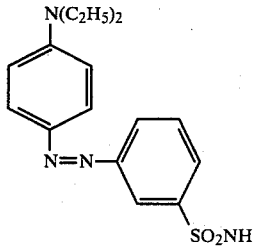

Compound C for Comparison:

-continued

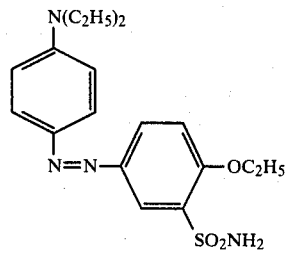

It can be seen clearly from FIG. 1 that the visible absorption spectrum of the dye compound released from the compound of the present invention is almost unchanged over a wide range of pH value, from about 9.2 to 4.51.

The compounds B and C, which were employed for comparison, have, on the contrary, proved to exhibit their respective visible absorption spectra varying greatly with pH in a range of 9.18 to 4.51.

In the photographic unit of a diffusion transfer process, pH value fluctuates widely inside the unit, from a high pH value (about 10 or above), which is experienced by the unit immediately after the spreading of the processing solution, to a low pH value (about 5 or below), which is experienced by the unit as a result of the working of a neutralization mechanism in which the acid polymer layer participates. Accordingly, the above-described compounds B and C which were examined for comparison are undesirable for use in the photographic unit, since they are attended by changes in the visible absorption spectra in such a pH range.

The compound A of the present invention possesses an advantage that the visible absorption spectrum thereof is almost unchanged over a wide pH range, as illustrated in Experiment 1.

Therefore, it is thought that the presence of two oxygen atoms in the $R^2$-O-$R^1$-O- group is of an important significance.

Experiment 2

The dye compound D released from Compound 6, which has the following structural formula:

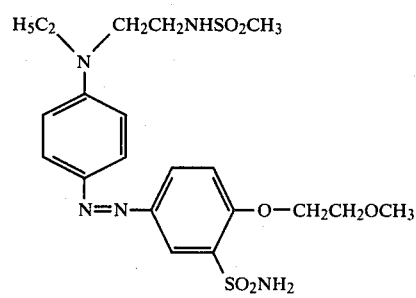

was dissolved in an amount of 20 mg in 5.0 ml of a 1/10 N sodium hydroxide aqueous solution. On a transparent support of polyethylene terephthalate film, was coated a mordanting layer containing the mordant having the following formula at the coverage of 3.0 g of mordant per square meter;

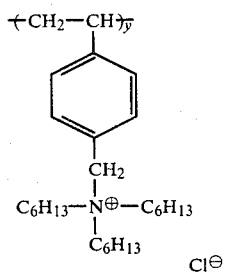

and it was, then, cut in strips. The mordanting strips were dipped in the solution of the aforementioned dye compound D for such a period that the dyed strips may have the absorbance of about 0.90 at the wavelength where the absorption of the dye compound has the maximum value. The thus obtained, dyed strips were dipped in a buffer solution adjusted to pH 5.0, and air-dried. The sample thus prepared was placed in a Pyrex glass tube, and exposed to light by means of a rotary irradiator (equipped with a 400 W high pressure mercury vapor lamp) and thereby, change in fading with the lapse of time was investigated and the half-life of fading ($t_{1/2}$) was determined.

For the purpose of comparison, the half-life of fading was determined with respect to the compound E represented by the following formula, which was employed for comparison with the compound D of the present invention, according to the same procedure as described above:

Compound E for Comparison

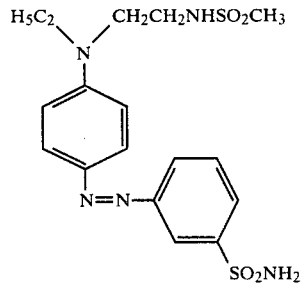

The results obtained are shown in Table 1.

TABLE 1

| Light-Fading of the Released Compounds | |
|---|---|
| Compound | $t_{\frac{1}{2}}$ (hr) |
| D | 37 |
| E | 34 |

As can be seen from Table 1, the dye compound D released from the compound of the present invention is excellent in light-fastness, compared with the compound E employed for comparison.

As described above, the compounds substituted with the $R^2$-O-$R^1$-O- group have proved to be compounds not causing the change in hue depending upon change in pH and that, to be compounds excellent in light-fastness.

EXAMPLE 1

On a transparent polyethylene terephthalate film support, were coated the layers described below in the order of description to prepare a light sensitive sheet:

(1) Mordanting layer containing 3.0 g/m² of the following mordant and 3.0 g/m² of gelatin.

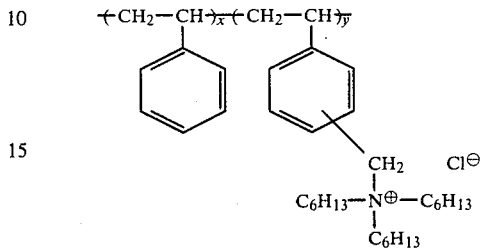

x:y = 50:50 (mole ratio)

(2) White light-reflecting layer containing 20 g/m² of titanium oxide and 2.0 g/m² of gelatin.

(3) Light shielding layer containing 2.70 g/m² of carbon black and 2.70 g/m² of gelatin.

(4) Layer containing a known cyan dye releasing redox compound of the structurel formula shown below (0.50 g/m²), diethyllaurylamide (0.25 g/m²) and gelatin (1.14 g/m²).

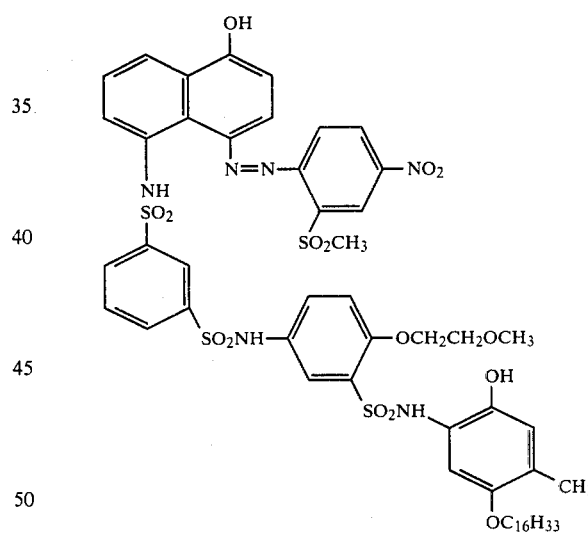

(5) Layer containing a red sensitive internal latent image type direct reversal silver iodobromide emulsion (containing 2 mol % of silver iodide, 1.9 g/m² of silver and 1.4 g/m² of gelatin), the fogging agent having the following structural formula (4.1 mg per mole of Ag) and sodium dodecylhydroquinonesulfonate (0.13 g/m²):

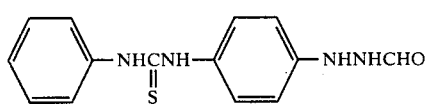

(6) Layer containing gelatin (2.6 g/m²) and 2,5-di-t-pentadecylhydroquinone (0.8 g/m²).

(7) Layer containing a known magenta dye releasing redox compound of the structural formula shown below (0.45 g/m²), diethyllaurylamide (0.10 g/m²), 2,5-di-t-butylhydroquinone (0.0074 g/m²) and gelatin (0.76 g/m²):

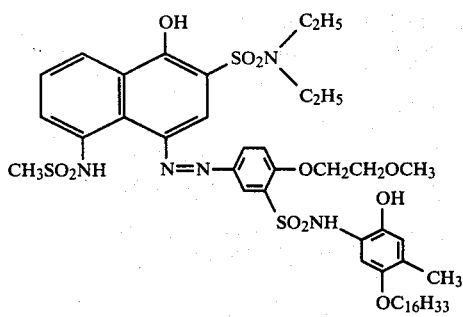

(8) Layer containing a green sensitive internal latent image type direct reversal silver iodobromide emulsion (containing 2 mol % of silver iodide, 1.4 g/m² of silver and 1.0 g/m² of gelatin), the same fogging agent as used in the fifth layer (3.1 mg per mol of Ag) and sodium dodecylhydroquinonesulfonate (0.11 g/m²).

(9) Layer containing gelatin (2.6 g/m²) and 2,5-di-t-pentadecylhydroquinone (0.8 g/m²).

(10) Layer containing Compound 1 of the present invention (0.80 g/m²), diethyllaurylamide (0.16 g/m²), 2,5-di-t-butylhydroquinone (0.012 g/m²) and gelatin (0.78 g/m²).

(11) Layer containing a blue sensitive internal latent image type direct reversal silver iodobromide emulsion (containing 2 mol % of silver iodide, 2.2 g/m² of silver and 1.7 g/m² of gelatin), the same fogging agent as used in the fifty layer (2.6 mg per mol of Ag) and sodium dodecylhydroquinonesulfonate (0.094 g/m²).

(12) Layer containing gelatin (0.94 g/m²).

The thus obtained light sensitive sheet was cut in pieces of appropriate size. The piece was set in a camera, and a photograph was taken. On the resulting light sensitive sheet, was superposed the cover sheet having the construction described hereinafter and then, the processing solution having the following composition was spread between these two sheets in a layer having the thickness of 85μ. Therein, the spreading was carried out with the aid of a pressure applying roller at a temperature of 25° C. As a result, beautiful color transferred image, wherein yellow color is, in particular, fast to light, is obtained.

| Processing Solution: | | |
|---|---|---|
| 1-Phenyl-4-methyl-4-hydroxymethyl-3-pyrazolidinone | 10 | g |
| Methylhydroquinone | 0.18 | g |
| 5-Methylbenzotriazole | 4.0 | g |
| Sodium Sulfite (Anhydrous) | 1.0 | g |
| Sodium Salt of Carboxymethyl Cellulose | 40.0 | g |
| Carbon Black | 150 | g |
| Potassium Hydroxide (28% Aqueous Solution) | 200 | cc |
| Water | 550 | cc |

The processing solution having the above-described composition was charged into a container designed so as to rupture under applied pressure and to spread 0.8 g of the processing solution therefrom.

Cover Sheet

Cover sheet prepared by coating on a transparent polyethylene terephthalate film support the following layers in this order;

(i) Acid polymer layer (neutralizing layer) containing 15 g/m² of polyacrylic acid (having viscosity of about 1,000 cp in a form of 10 wt. % aqueous solution), and (ii) Timing layer containing 3.8 g/m² of acetyl cellulose (that which produced 39.4 g of acetyl group upon the hydrolysis of 100 g of acetyl cellulose) and 0.2 g/m² of styrene-maleic anhydride copolymer (composition ratio; styrene:maleic anhydride=about 60:40, molecular weight; about 50,000).

While the invention has been described in detail and with reference to specific embodiments thereof, it will be apparent to one skilled in the art that various changes and modifications can be made therein without departing from the spirit and scope thereof.

What is claimed is:

1. A photographic light-sensitive sheet having at least one light sensitive silver halide emulsion layer, at least one of said emulsion layers having associated therewith an azo dye providing compound represented by the formula (I) or (II):

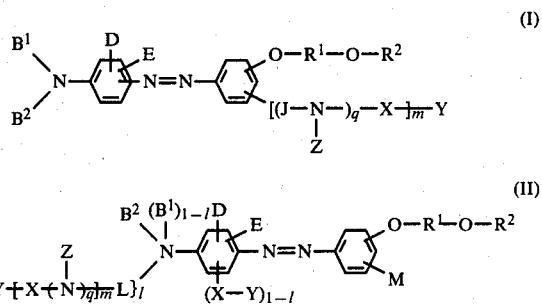

wherein
$B^1$ represents a hydrogen atom, a substituted or unsubstituted alkyl group, a substituted or unsubstituted aryl group or a substituted or unsubstituted aralkyl group;
$B^2$ represents a hydrogen atom, a substituted or unsubstituted alkyl group, a substituted or unsubstituted aryl group, a substituted or unsubstituted aralkyl group, an acyl group of the formula —$COR^3$ (where $R^3$ represents an alkyl group, a substituted alkyl group, an aralkyl group or a substituted or unsubstituted aryl group), an alkylsulfonyl group, a substituted alkylsulfonyl group or an arylsulfonyl group;
D represents a hydrogen atom, an alkyl group, a substituted alkyl group, an alkoxy group, a substituted alkoxy group or a halogen atom;
E represents a hydrogen atom, a trifluoromethyl group, a carboxylic acid ester group of the formula —$COOR^3$ where $R^3$ is defined above, a nitro group, a halogen atom, an alkyl group, a substituted alkyl group, an alkoxy group, a substituted alkoxy group, an alkylsulfonyl group, a substituted alkoxy group, an alkylsulfonyl group, a substituted alkylsulfonyl group, an arylsulfonyl group, an alkylcarbonyl group, a substituted alkylcarbonyl group, a sulfonamido group of the formula —$NHSO_2R^3$ where $R^3$ is defined above, a carbonamido group of the formula —$NHCOR^3$ where $R^3$ is defined above, a sulfamoyl group of the formula —$SO_2NR^4R^5$ (where $R^4$ represents a hydrogen atom, an alkyl group or a substituted alkyl group and $R^5$ represents a hydrogen atom, an alkyl group, a substituted alkyl group, an aralkyl group or a substituted or unsubstituted aryl group and further $R^4$ and $R^5$ may combine directly or through an oxygen atom to form a ring), or a carbamoyl group of the formula —$CONR^4R^5$ where $R^4$ and $R^5$ are defined above;

$R^1$ represents an alkylene group having 2 or more carbon atoms and the two oxygen atoms bound to $R^1$ are attached to different carbon atoms;

$R^2$ represents an alkyl group or a substituted alkyl group;

m represents 1 and q represents 0;

J represents a divalent group, a sulfonyl group or a carbon group;

Z represents a hydrogen atom, an alkyl group or a substituted alkyl group;

X represents a divalent connecting group of the formula —$A_1$-$(T)_n$-$(A_2)_p$— wherein $A_1$ and $A_2$ may be the same or different and each represents an alkylene group or an arylene group; T represents a divalent group selected from an oxy group, a carbonyl group, a carboxyamido group, a carbamoyl group, a sulfonamido group, a sulfamoyl group, a sulfinyl group and a sulfonyl group; and n and p each represents 0 or 1;

l represents 1 or 0;

L represents an alkylene group or an arylene group;

M represents a hydrogen atom, an alkyl group, a substituted alkyl group, an alkoxy group, a substituted alkoxy group, a halogen atom, a sulfamoyl group of the formula —$SO_2NR^4R^5$ or a carbamoyl group of the formula —$CONR^4R^5$ where $R^4$ and $R^5$ are defined above; and Y represents a sulfamoyl group represented by formula (A), (B), (C) or (D) which provides an azo dye compound differing in the diffusibility from the compound represented by the general formula (I) or (II) as a result of developing under an alkaline condition

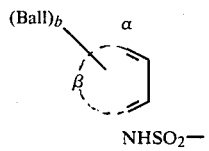

NHSO$_2$— wherein $\beta$ represents the nonmetal atoms necessary to form a benzene ring, which benzene ring may be condensed with a carbocylic ring or a heterocyclic ring to form a condensed ring;

$\alpha$ represents a group of the formula —$OG^1$ or —$NHG^2$ wherein $G^1$ represents a hydrogen atom or a group capable of producing a hydroxy group when hydrolyzed and $G^2$ represents a hydrogen atom, an alkyl group having 1 to 22 carbon atoms or a hydrolyzable groups;

b represents 0, 1 or 2 wherein b is 1 or 2 except when $\alpha$ represents the group —$NHG^2$ and $G^2$ contains a group which renders the compound immobile and nondiffusible; and Ball represents a ballast group;

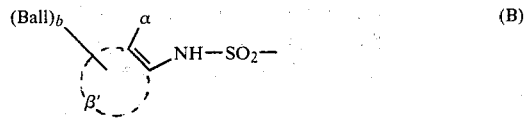

wherein Ball, $\alpha$ and b, respectively, have the same meanings as in formula (A), and $\beta'$ represents atoms necessary to form a carbocyclic ring which may be condensed with a carbocyclic ring or heterocyclic ring to form a condensed ring system;

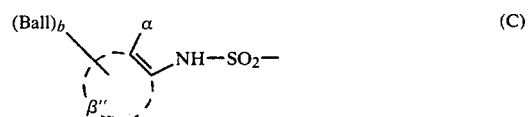

wherein Ball, b and $\alpha$, respectively, have the same meanings as in formula (A), and $\beta''$ represents the atoms necessary to form a heterocyclic ring which may be condensed with a carbocyclic ring or a heterocyclic ring;

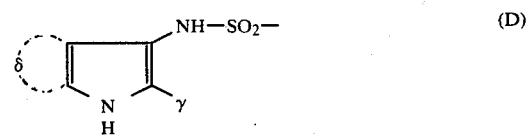

wherein $\gamma$ represents a hydrogen atom, or an alkyl group, an aryl group or a heterocyclic ring residue or a —CO—$G^6$ group where

wherein $G^7$ represents a hydrogen atom, an alkyl group, a cycloalkyl group or an aryl group; $G^8$ has the same definition as $G^7$ or is an acyl group derived from an aliphatic or an aromatic carboxylic acid or from a sulfonic acid; and $G^9$ represents a hydrogen atom or a substituted or unsubstituted alkyl group, further wherein the —O—$R^1$—$R^2$ group is ortho the

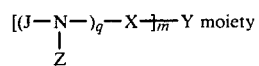

in formula (I) and ortho the

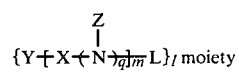

in formula (II).

2. The photographic light-sensitive sheet of claim 1, wherein $R^1$ represents a straight chain alkylene group having 2 to 4 carbon atoms or a branched chain alkylene group having 3 or 4 carbon atoms.

3. The photographic light-sensitive sheet of claim 1, wherein $R^1$ represents a dimethylene group.

4. The photographic light-sensitive sheet of claim 1, wherein $R^2$ represents a straight chain or branched chain alkyl group having 1 to 8 carbon atoms.

5. The photographic light-sensitive sheet of claim 1, wherein $R^2$ represents an unsubstituted straight chain or branched chain alkyl group having 1 to 4 carbon atoms.

6. The photographic light-sensitive sheet of claim 1, wherein $R^2$ represents an alkyl group having 1 to 8 carbon atoms in the alkyl moiety and substituted with an alkoxy group, a dialkylamino group, a halogen atom, a cyano group or a hydroxy group.

7. The photographic light-sensitive sheet of claim 1, wherein $B^1$ and $B^2$ may be the same or different and represent a straight chain or branched chain alkyl group having 1 to 4 carbon atoms, a straight chain or branched chain alkyl group having 1 to 4 carbon atoms in the alkyl moiety and substituted with a cyano group, an alkoxy group, a hydroxy group, a carboxyl group, a sulfo group, a halogen atom, a sulfamoyl group of the formula $-SO_2NR^4R^5$, a carbamoyl group of the formula $-CONR^4R^5$, a sulfonamido group of the formula $-NHSO_2R^3$, a carbonamido group of the formula $-NHCOR^3$, an alkylsulfonyl group, or an arylsulfonyl group.

8. The photographic light-sensitive sheet of claim 1, wherein $R^4$ represents a hydrogen atom and $R^5$ represents a hydrogen atom or an alkyl group having 1 to 4 carbon atoms.

9. The photographic light-sensitive sheet of claim 1, wherein D represents a hydrogen atom, a straight chain or branched chain alkyl group having 1 to 4 carbon atoms, an alkoxy group having 1 to 4 carbon atoms, or a halogen atom.

10. The photographic light-sensitive sheet of claim 1, wherein E represents a hydrogen atom; a trifluoromethyl group; a straight chain or branched chain alkyl group having 1 to 4 carbon atoms; a nitro group; a halogen atom; a sulfamoyl group of the formula $-SO_2NR^4R^5$, wherein $R^4$ and $R^5$ represent an alkyl group having 1 to 4 carbon atoms, or a substituted alkyl group having 1 to 4 carbon atoms in the alkyl moiety and substituted with a cyano group, an alkoxy group, a hydroxy group, a carboxy group or a sulfo group or $R^4$ and $R^5$ may combine directly or through an oxygen atom to form a 5- or 6-membered ring; or a carbamoyl group of the formula $-CONR^4R^5$ wherein $R^4$ and $R^5$ are defined as for said sulfamoyl group.

11. The photographic light-sensitive sheet of claim 1, wherein $R^3$ represents an alkyl group having 1 to 8 carbon atoms in the alkyl moiety which may be substituted or unsubstituted, a substituted or unsubstituted benzyl group; or a substituted or unsubstituted phenyl group.

12. The photographic light-sensitive sheet of claim 1, wherein $R^4$ represents a hydrogen atom or an alkyl group having 1 to 8 carbon atoms in the alkyl moiety which may be substituted or unsubstituted, and $R^5$ represents a hydrogen atom, an alkyl group having 1 to 8 carbon atoms in the alkyl moiety which may be substituted or unsubstituted, an unsubstituted benzyl group, a substituted or unsubstituted phenyl group, or $R^4$ and $R^5$ may combine directly or through an oxygen atom to form a ring.

13. The photographic light-sensitive sheet of claim 1, wherein $A^1$ and $A^2$ may be same or different and represent an alkylene group or a phenylene group.

14. The photographic light-sensitive sheet of claim 1, wherein Z represents a hydrogen atom.

15. The photographic light-sensitive sheet of claim 1, wherein q is 0, p is 0, $A^1$ represents an alkylene group or a phenylene group and T represents $-NHSO_2-$.

16. The photographic light-sensitive sheet of claim 1, wherein L represents a straight chain or branched chain alkylene group having 1 to 4 carbon atoms or a phenylene group.

17. The photographic light-sensitive sheet of claim 1, wherein M represents a sulfamoyl group of the formula $-SO_2NR^4R^5$, wherein $R^4$ and $R^5$ may be the same or different and represent an alkyl group having 1 to 4 carbon atoms in the alkyl moiety which may be substituted by a cyano group, an alkoxy group, a hydroxy group, a carboxy group, or a sulfo group, and $R^4$ and $R^5$ may combine directly or through an oxygen atom to form a 5- or 6-membered ring.

18. The photographic light-sensitive sheet of claim 1, wherein said compounds of the formulae (I) and (II) are dye releasing redox compounds.

19. The photographic light-sensitive sheet of claim 1, wherein said compounds of the formulae (I) and (II) are dye developers.

20. The photographic light-sensitive sheet of claim 1, wherein said compounds of the formulae (I) and (II) are compounds which release a diffusible dye through self-ring closure.

21. The photographic light-sensitive sheet of claim 1, wherein said compounds of the formulae (I) and (II) are dye releasing couplers.

22. The photographic light-sensitive material of claim 1, wherein Y is a moiety of the formula (A).

23. The photographic light-sensitive sheet of claim 1, wherein Y is a moiety of the formula (B).

24. The photographic light-sensitive sheet of claim 1, wherein Y is a moiety represented by the formula (C).

25. The photographic light-sensitive sheet of claim 1, wherein Y is a moiety of the formula (D).

26. The photographic light-sensitive sheet of claim 1, wherein $R^1$ represents $-CH_2CH_2-$;

$R^2$ represents a straight chain or branched chain alkyl group having 1 to 4 carbon atoms;

$B^1$ and $B^2$ may be the same or different and each represents a straight chain or branched shain alkyl group having 1 to 4 carbon atoms which may be substituted with a cyano group, an alkoxy group, a hydroxy group, a carboxyl group, a sulfo group, a halogen atom, a sulfamoyl group of the formula $-SO_2NR^4R^5$, a carbamoyl group of the formula $-CONR^4R^5$, a sulfonamido group of the formula $-NHSO_2R^3$ or a carbonamido group of the formula $-NHCOR^3$;

D represents a hydrogen atom, a straight chain or branched chain alkyl group having 1 to 4 carbon atoms, a straight chain or branched chain alkoxy group having 1 to 4 carbon atoms, or a halogen atom;

E represents a hydrogen atom, a trifluoromethyl group, a straight or branched chain alkyl group having 1 to 4 carbon atoms, a nitro group, a halogen atom, a sulfamoyl group of the formula $-SO_2NR^4R^5$ or a carbamoyl group of the formula $-CONR^4R^5$ wherein $R^4$ and $R^5$ may be the same or different and represents an alkyl group having 1 to 4 carbon atoms which may be substituted by a cyano group, an alkoxy group, a hydroxy group, a carboxy group, a sulfo group or $R^4$ and $R^5$ may combine directly or through an oxygen atom to form a 5- or 6-membered ring;

Y-X represents Y-alkylene—NHSO$_2$— or Y-arylene—NHSO$_2$— and Y represents a N-substituted sulfamoyl group;

m represents 1;

q represents 0;

L represents a straight chain or branched chain alkylene group having 1 to 4 carbon atoms or a phenylene group;

and M represents a sulfamoyl group of the formula —SO$_2$NR$^4$R$^5$.

27. The photographic light-sensitive sheet of claim 26, wherein B$^1$ and B$^2$ may be the same or different and each represents a straight chain alkyl group having 1 to 4 carbon atoms which may be substituted with a cyano group, a hydroxy group, a halogen atom, a sulfamoyl group of the formula —SO$_2$NR$^4$R$^5$, a carbamoyl group of the formula —CONR$^4$R$^5$, a sulfonamido group of the formula —NHSO$_2$R$^3$ or a carbonamido group of the formula —NHCOR$^3$;

D and E, which may be the same or different each represents a hydrogen atom, a methyl group, an ethyl group, a methoxy group, an ethoxy group or a halogen atom;

Y-X represents Y-arylene—NHSO$_2$— and Y represents a N-substituted sulfamoyl group;

L represents a straight chain alkylene group having 1 to 4 carbon atoms;

and M represents a —SO$_2$NR$^4$R$^5$ group wherein R$^4$ and R$^5$ each represents a hydrogen atom, a methyl group or an ethyl group.

28. The photographic light sensitive sheet of claim 1, wherein the moiety Y—X in formula (I) or (II) is Y-arylene—NHSO$_2$—.

29. The photographic light sensitive sheet of claim 28, wherein Y-arylene—NHSO$_2$— is Y-phenylene—NHSO$_2$.

* * * * *